United States Patent
Christofferson et al.

(10) Patent No.: US 7,006,616 B1
(45) Date of Patent: Feb. 28, 2006

(54) TELECONFERENCING BRIDGE WITH EDGEPOINT MIXING

(75) Inventors: Frank C. Christofferson, Broomfield, CO (US); Edward M. Miller, Broomfield, CO (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 0 days.

(21) Appl. No.: 09/571,577

(22) Filed: May 15, 2000

Related U.S. Application Data

(60) Provisional application No. 60/135,239, filed on May 21, 1999, provisional application No. 60/139,616, filed on Jun. 17, 1999.

(51) Int. Cl.
   H04M 3/42 (2006.01)
(52) U.S. Cl. .................................. 379/202.01; 379/263
(58) Field of Classification Search ........... 379/202.01, 379/263, 266, 267
   See application file for complete search history.

(56) References Cited

U.S. PATENT DOCUMENTS

| | | | |
|---|---|---|---|
| 5,020,098 A | 5/1991 | Celli | |
| 5,034,947 A | 7/1991 | Epps | |
| 5,259,035 A * | 11/1993 | Peters et al. ................ | 381/110 |
| 5,379,280 A | 1/1995 | Cotton et al. | |
| 5,383,184 A | 1/1995 | Champion | |
| 5,390,177 A | 2/1995 | Nahumi | |
| 5,440,624 A | 8/1995 | Schoof, II | |
| 5,473,363 A | 12/1995 | Ng et al. | |
| 5,483,588 A | 1/1996 | Eaton et al. | |
| 5,513,328 A | 4/1996 | Christofferson | |
| 5,550,906 A | 8/1996 | Chau et al. | |
| 5,619,555 A | 4/1997 | Fenton et al. | |
| 5,736,982 A | 4/1998 | Suzuki et al. | |
| 5,775,996 A | 7/1998 | Othmer et al. | |
| 5,818,836 A | 10/1998 | DuVal | |
| 5,822,523 A | 10/1998 | Rothschild et al. | |
| 5,828,843 A | 10/1998 | Grimm et al. | |
| 5,835,722 A | 11/1998 | Bradshaw et al. | |
| 5,884,039 A | 3/1999 | Ludwig et al. | |
| 5,889,958 A | 3/1999 | Willens | |
| 5,894,510 A | 4/1999 | Felger | |
| 5,894,556 A | 4/1999 | Grimm et al. | |
| 5,903,629 A | 5/1999 | Campbell, IV et al. | |

(Continued)

FOREIGN PATENT DOCUMENTS

EP     0 779 732     6/1996

(Continued)

*Primary Examiner*—Ahmad F. Matar
*Assistant Examiner*—Rasha S. AL-Aubaidi
(74) *Attorney, Agent, or Firm*—Heimbecher & Assoc., LLC

(57) ABSTRACT

In accordance with the principles of the present invention, an audio-conference bridging system and method are provided. The present invention discards the traditional notion of a single mixing function for a conference. Instead, the novel, flexible design of the present invention provides a separate mixing function for each participant in the conference. This new architecture is described generally herein as "EdgePoint mixing." EdgePoint mixing overcomes limitations of traditional conferencing systems by providing each participant control over his/her conference experience. EdgePoint mixing also allows, when desired, the simulation of a "real-life" conference by permitting each participant to receive a distinctly mixed audio signal from the conference depending on the speaker's "position" within a virtual conference world. The present invention also preferably accommodates participants of different qualities of service. Each participant, thus, is able to enjoy the highest-level conferencing experience that his/her own connection and equipment will permit.

30 Claims, 11 Drawing Sheets

U.S. PATENT DOCUMENTS

| | | |
|---|---|---|
| 5,903,637 A | 5/1999 | Hogan et al. |
| 5,916,302 A | 6/1999 | Dunn et al. |
| 5,940,488 A | 8/1999 | DeGrazia et al. |
| 5,940,489 A | 8/1999 | Cohn et al. |
| 5,973,724 A | 10/1999 | Riddle |
| 5,978,467 A | 11/1999 | Walker et al. |
| 5,987,118 A | 11/1999 | Dickerman et al. |
| 5,991,277 A | 11/1999 | Maeng et al. |
| 5,991,385 A | 11/1999 | Dunn et al. |
| 5,999,977 A | 12/1999 | Riddle |
| 6,008,838 A | 12/1999 | Iizawa |
| 6,018,766 A | 1/2000 | Samuel et al. |
| 6,023,729 A | 2/2000 | Samuel et al. |
| 6,038,599 A | 3/2000 | Black et al. |
| 6,049,341 A | 4/2000 | Mitchell et al. |
| 6,094,675 A | 7/2000 | Sunaga et al. |
| 6,178,237 B1 * | 1/2001 | Horn .................. 379/202.01 |

FOREIGN PATENT DOCUMENTS

| | | |
|---|---|---|
| JP | 03 252258 | 11/1991 |
| JP | 07 092988 | 4/1995 |
| WO | WO 96/14908 | 5/1996 |
| WO | WO 97/28502 | 8/1997 |
| WO | WO 97/35258 | 9/1997 |
| WO | WO 98/31125 | 7/1998 |

* cited by examiner

Figure 9

| Event | System Control Unit | Audio Bridging Unit | Participant | Mixed Signal |
|---|---|---|---|---|
| Participants A, B, C already in room and equidistant from one another. | Receives positions of A, B, C and calculates mixing parameters for each participant station. | Mixes separate signals for A, B, C based on mixing parameters for each (e.g., A's mixed signal = equal parts B and C audio inputs). | A | 50%(B) + 50%(C) |
| | | | B | 50%(A) + 50%(C) |
| | | | C | 50%(A) + 50%(B) |
| A moves closer to B (A & B still equidistant from C). | Receives positions of A, B, C and recalculates mixing parameters for each participant station. | Remixes separate signals for A, B, C based on revised mixing parameters (e.g., A's mixed signal will include more gain on B's audio input and less on C's than previously). | A | 70%(B) + 30%(C) |
| | | | B | 70%(A) + 30%(C) |
| | | | C | 50%(A) + 50%(B) |
| Participant B utters a vulgarity. | Receives notification from Speech Recognition Module of vulgarity in B's incoming Audio Stream and recalculates C's mixing parameters to mute B from C's mixed signal. | Remixes C's mixed signal to mute B. Mixed signals to A and B are unchanged. | A | 70%(B) + 30%(C) |
| | | | B | 70%(A) + 30%(C) |
| | | | C | 100%(A) + 0%(B) |

TELECONFERENCING BRIDGE WITH EDGEPOINT MIXING

RELATED APPLICATIONS

This application claims priority to U.S. Provisional Application No. 60/135,239, entitled "Teleconferencing Bridge with EdgePoint Mixing" filed on May 21, 1999, and U.S. Provisional Application No. 60/139,616, filed on Jun. 17, 1999, entitled "Automatic Teleconferencing Control System," both of which are incorporated by reference herein. This application is also related to U.S. Provisional Application No. 60/204,438, filed concurrently herewith and entitled "Conferencing System and Method," which is also incorporated by reference herein.

BACKGROUND OF THE INVENTION

1. Field of the Invention

This invention relates to communication systems, and, more particularly, to an audio-conferencing system capable of providing a realistic lifelike experience for conference participants and a high level of control over conference parameters.

2. Description of the Related Art

In a communication network, it is desirable to provide conference arrangements whereby many participants can be bridged together on a conference call. A conference bridge is a device or system that allows several connection endpoints to be connected together to establish a communications conference. Modern conference bridges can accommodate both voice and data, thereby allowing, for example, collaboration on documents by conference participants.

Historically, however, the audio-conferencing experience has been less than adequate, especially for conferences with many attendees. Problems exist in the areas of speaker recognition (knowing who is talking), volume control, speaker clipping, speaker breakthrough (the ability to interrupt another speaker), line noise, music-on-hold situations, and the inability of end users to control the conferencing experience.

In traditional systems, only one mixing function is applied for the entire audio conference. Automatic gain control is used in an attempt to provide satisfactory audio levels for all participants; however, participants have no control of the audio mixing levels in the conference other than adjustments on their own phones (such as changing the audio level of the entire, mixed conference—not any individual voices therein). As such, amplification or attenuation of individual conference participant voices is not possible. Further, with traditional conference bridging techniques, it is difficult to identify who is speaking other than by recognition of the person's voice or through the explicit stating of the speaker's name. In addition, isolation and correction of noisy lines is possible only through intervention of a human conference operator.

The inflexibility of traditional conferencing systems causes significant problems. For example, traditional conferencing systems cannot fully accommodate users having conference connections and/or endpoint devices of differing quality. Some conference participants, because of the qualities of their connection to the conference and/or endpoint conference equipment are capable of receiving high-fidelity mixed audio signals from the conference bridge. Because only one mixing algorithm is applied to the entire conference, however, the mixing algorithm must cater to the lowest-level participant. Thus, the mixing algorithm typically allows only two people to talk and a third person to interrupt even though certain conferees could accommodate a much-higher fidelity output from the conference bridge.

In addition, traditional audio bridging systems attempt to equalize the gain applied to each conference participant's voice. Almost invariably, however, certain participants are more difficult to hear than others due to variation in line quality, background noise, speaker volume, microphone sensitivity, etc. For example, it is often the case during a business teleconference that some participants are too loud and others too soft. In addition, because traditional business conferencing systems provide no visual interface, it is difficult to recognize who is speaking at any particular moment. Music-on-hold can also present a problem for traditional systems as any participant who puts the conference call on hold will broadcast music to everyone else in the conference. Without individual mixing control, the conference participants are helpless to mute the unwanted music.

A particular audio-conference environment in need of greater end-user control is the "virtual chat room." Chat rooms have become popular on the Internet in recent years. Participants in chat rooms access the same web site via the Internet to communicate about a particular topic to which the chat room is dedicated, such as sports, movies, etc. Traditional "chat rooms" are actually text-based web sites whereby participants type messages in real time that can be seen by everyone else in the "room." More recently, voice-based chat has emerged as a popular and more realistic alternative to text chat. In voice chat rooms, participants actually speak to one another in an audio conference that is enabled via an Internet web site. Because chat-room participants do not generally know each other before a particular chat session, each participant is typically identified in voice chat rooms by their "screen name," which may be listed on the web page during the conference.

The need for greater end-user control over audio-conferencing is even more pronounced in a chat-room setting than in a business conference. Internet users have widely varying quality of service. Among other things, quality of service depends on the user's Internet service provider (ISP), connection speed, and multi-media computing capability. Because quality of service varies from participant to participant in a voice chat room, the need is especially keen to provide conference outputs of varying fidelity to different participants. In addition, the clarity and volume of each user's incoming audio signal varies with his/her quality of service. A participant with broadband access to the internet and a high-quality multi-media computer will send a much clearer audio signal to the voice chat room than will a participant using dial-up access and a low-grade personal computer. As a result, the volume and clarity of voices heard in an Internet chat room can vary significantly.

In addition, the content of participants' speech goes largely unmonitored in voice chat rooms. Some chat rooms include a "moderator"—a human monitor charged with ensuring that the conversation remains appropriate for a particular category. For example, if participants enter a chat room dedicated to the discussion of children's books, a human moderator may expel a participant who starts talking about sex or using vulgarities. Not all chat web sites provide a human moderator, however, as it is cost-intensive. Moreover, even those chat rooms that utilize a human monitor generally do not protect participants from a user who is simply annoying (as opposed to vulgar).

Indeed, without individual mixing control or close human monitoring, a chat room participant is forced to listen to all other participants, regardless of how poor the sound quality or how vulgar or annoying the content. Further, traditional chat rooms do not give the user a "real life" experience. Participant voices are usually mixed according to a single algorithm applied across the whole conference with the intent to equalize the gain applied to each participant's voice. Thus, everyone in the conference receives the same audio-stream, which is in contrast to a real-life room full of people chatting. In a real-life "chat room," everyone in the room hears something slightly different depending on their position in the room relative to other speakers.

Prior attempts to overcome limitations in traditional conferencing technology (such as the use of "whisper circuits") are inadequate as they still do not provide conference participants with full mixing flexibility. A need remains for a robust, flexible audio-conference bridging system.

SUMMARY OF THE INVENTION

In accordance with the principles of the present invention, an audio-conference bridging system and method are provided. The present invention discards the traditional notion of a single mixing function for a conference. Instead, the novel, flexible design of the present invention provides a separate mixing function for each participant in the conference. This new architecture is described generally herein as "EdgePoint mixing."

EdgePoint mixing overcomes limitations of traditional conferencing systems by providing each participant control over his/her conference experience. For example, music on hold is not a problem for a business teleconference facilitated by the present invention. The remaining participants can simply attenuate the signal of the participant who put the conference on hold and cease attenuation once that participant returns to the conference. Similarly, soft speakers or speakers who cannot be heard clearly due to line noise can be amplified individually by any participant.

EdgePoint mixing also allows, when desired, the simulation of a "real-life" conference by permitting each participant to receive a distinctly mixed audio signal from the conference depending on the speaker's "position" within a virtual conference world. Preferably, participants in a conference are provided with a visual interface showing the positions of other participants in the virtual conference world. The mixing parameters then change for that participant as he/she moves around the virtual conference world (moving closer to certain conferees and farther away from others).

A preferred embodiment of the present invention allows dynamic modification of each participant's mixing parameters according to a three-tiered control system. First, default mixing parameters are set according to an algorithm, such as distance-based attenuation in a virtual chat room. The algorithm-determined mixing parameters can then be automatically altered according to a system-set or participant-set policy, such as muting of vulgar speakers. Finally, the algorithm and/or policy can be overridden by an explicit participant request, such as a request to amplify the voice of a particular speaker.

The present invention also preferably accommodates participants of different qualities of service. In this manner, participants with high speed connections and/or high-fidelity endpoint conferencing equipment receive a better-mixed signal than participants in the same conference with lower speed connections or lower-fidelity equipment. Each participant, then, is able to enjoy the highest-level conferencing experience that their own connections and equipment will permit.

BRIEF DESCRIPTION OF THE DRAWINGS

The features of the subject invention will become more readily apparent and may be better understood by referring to the following detailed description of an illustrative embodiment of the present invention, taken in conjunction with the accompanying drawings, where.

DETAILED DESCRIPTION OF PREFERRED EMBODIMENTS

The system and method of the present invention overcome limitations of traditional bridges by providing a separate mixing function for each participant in a conference. The present invention thus supports conference applications seeking to deliver a more realistic simulation of a real-world meeting experience. In live face-to-face meetings, each participant hears something slightly different, due to position and room acoustics, etc. In other words, each person actually has a separate mixing function, which is implemented in his or her auditory system. By providing each conference participant with a separate mixing function, the present invention permits recreation of a real-world conference environment.

The present invention also preferably provides a high degree of end-user control in a conference. That control can be used to amplify other speakers who are difficult to hear, attenuate sources of noise, filter out unwanted content (such as vulgarity), etc. Thus, each participant can tailor the audio qualities of the conference to meet his or her needs exactly. This capability, of course, is not easily attainable in live meetings, especially when the meeting is large. Thus, EdgePoint mixing can provide, if desired, a "better than live" experience for participants.

Figure 1:
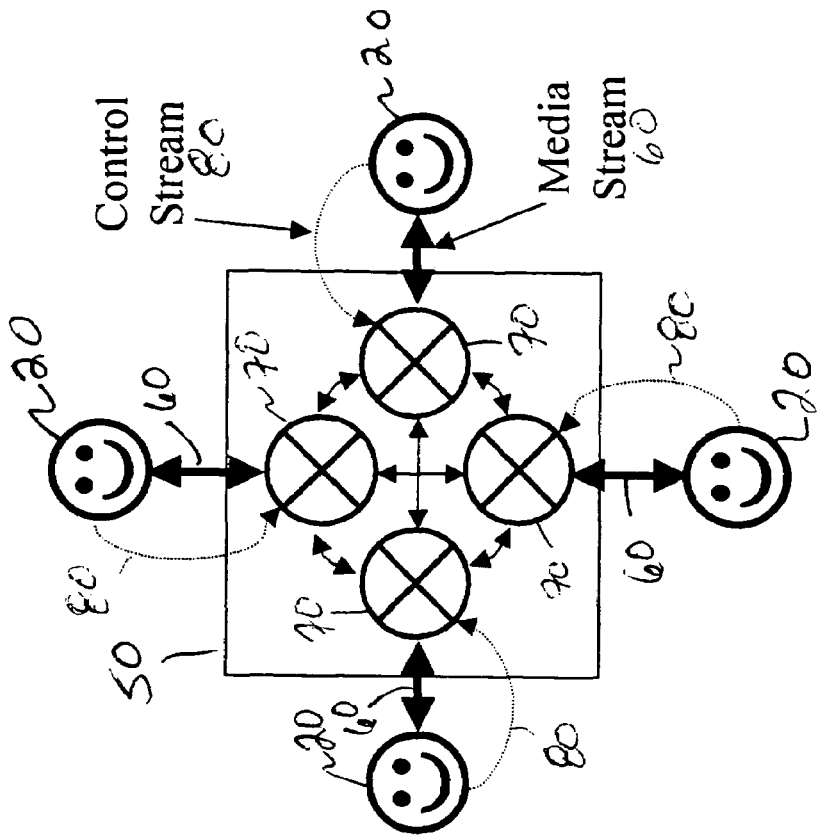
FIG. 1 is a simplified flow diagram illustrating the difference between a prior art mixing algorithm and EdgePoint mixing according to the present invention.
Figure 1:
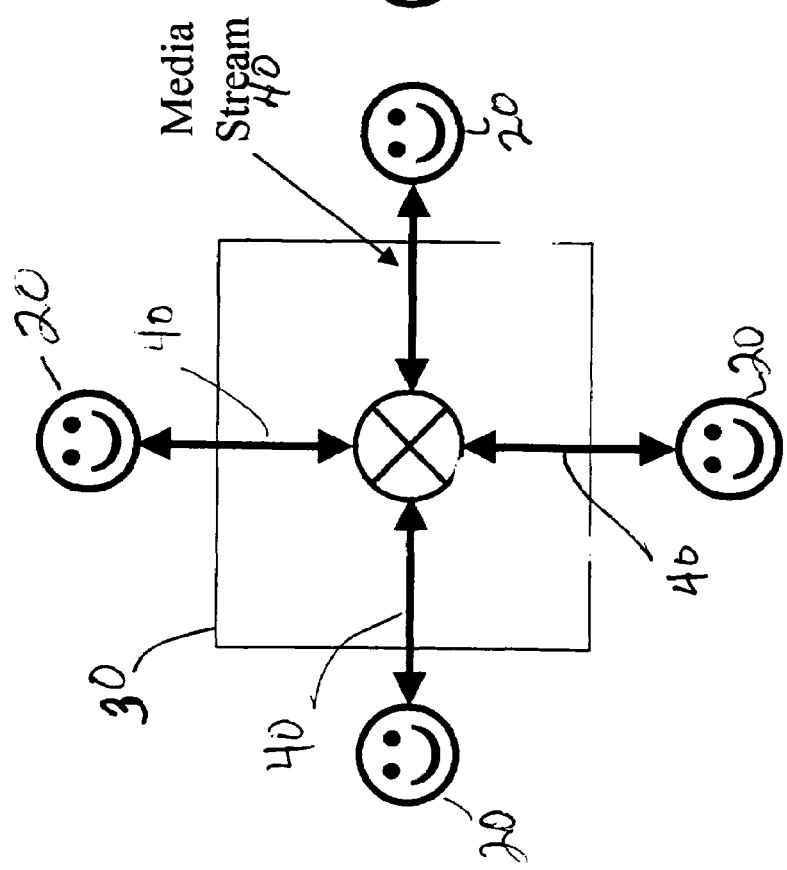

A conceptual difference between EdgePoint mixing and conventional mixing is illustrated simply by FIG. 1. As shown in FIG. 1, in a traditionally mixed conference, each participant 20 transmits his/her media stream to the conference bridge 30. The conference bridge 30 applies a single mixing function to the conference and outputs a mixed signal to each participant 20. Because only a single mixing function is applied to the conference 10, each participant receives essentially the same mixed signal.

EdgePoint mixing is much more flexible. Each participant 20 transmits his/her media stream 60 to the conference bridge 50. The conference bridge 50, however, includes a separate EdgePoint mixer 70 for each participant 20. In addition, each participant transmits a control stream 80 to the audio bridge 50. Based at least in part on the control streams 80, the audio bridge 50 returns a separately mixed audio signal to each participant 20. Because each participant's control stream 80 is likely to be distinct, each participant 20 is able to enjoy a distinct and fully tailored conference experience.

Figure 2:
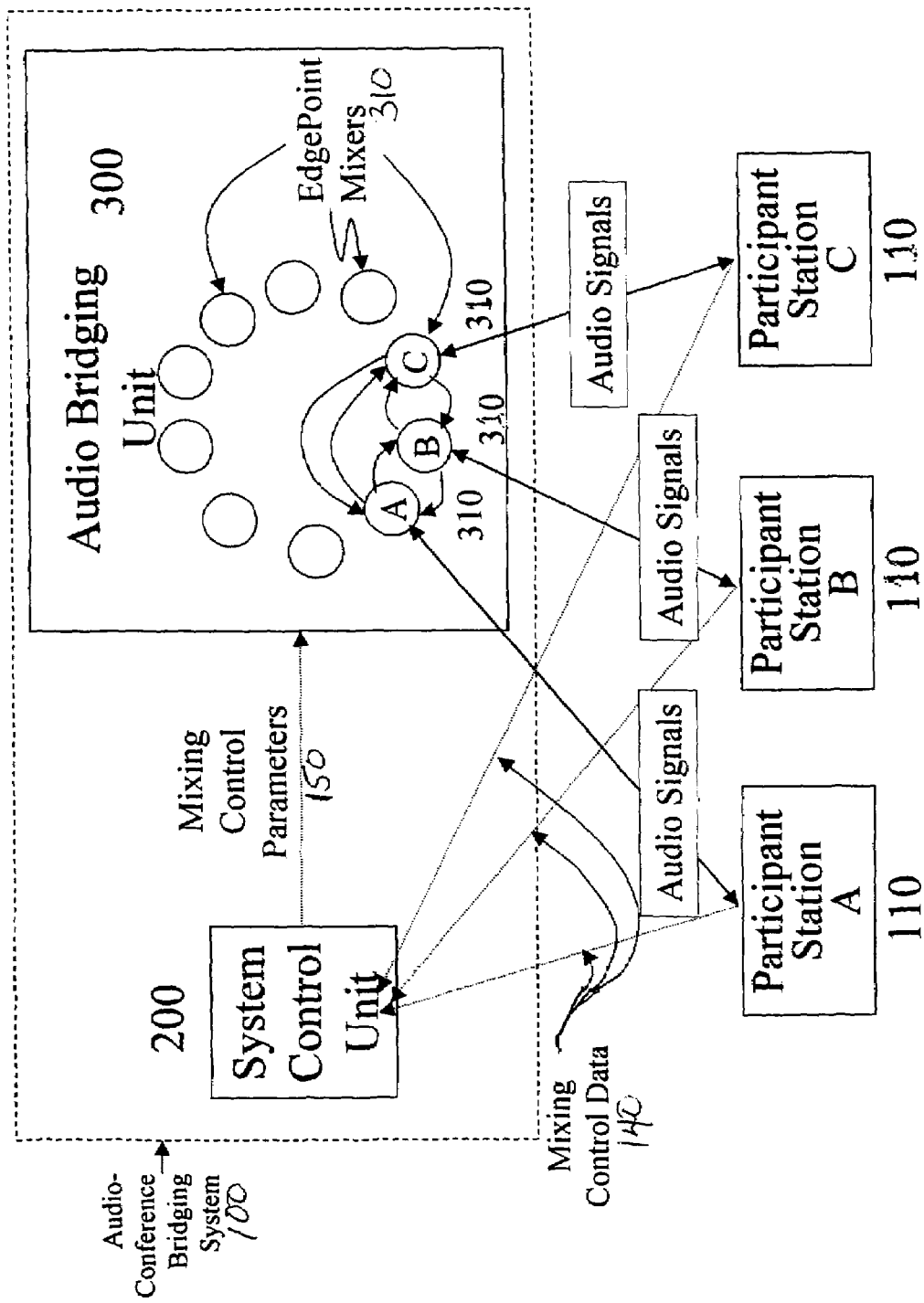
FIG. 2 is a simplified block diagram of the audio-conference bridging system of the present invention and three participant stations.

FIG. 2 is a block diagram illustrating the general organization of an audio-conference bridging system 100 according to the present invention. In the exemplary embodiment shown, a number of conference participant stations (A, B and C) 110 are interfaced with a system control unit 200 and an audio bridging unit 300. Although only three participant stations 110 are shown, any number of stations 110 can be connected to the present system 100. The system control unit 200 is generally responsible for receiving mixing control data 140 for the participant stations 110 and translating that data into mixing control parameters 150 to be implemented by the audio bridging unit 300. Although both the system control unit 200 and audio bridging unit 300 could conceivably be implemented purely in hardware, it is preferred that each and/or both units 200, 300 comprise a computer program running on an appropriate hardware platform.

In a preferred embodiment of the invention, the interface between the conference participant stations 110 and the system control unit 200 utilizes a packet-switched network, such as an internet protocol (IP) network. The media interface between the conference participant stations 110 and the audio bridging unit 300 may be over a separate communications network, such as the public switched telephone network (PSTN), a packet-switched network, or a combination of the two in which a PSTN-to-packet-switched network gateway is traversed. The participant stations 110, however, can be connected to the present system by any communications network, including local area networks (such as Ethernet), private networks, circuit-switched networks, etc.

Audio bridging unit 300 contains a plurality of EdgePoint mixers 310. In the preferred embodiment, each EdgePoint mixer 310 is a software process running on, or implemented as part of, the audio bridging unit 300. Preferably, each participant station 110 (e.g., A, B and C) is allocated one EdgePoint mixer 310, which performs audio mixing for that participant station 110 by mixing a plurality of the incoming audio signals according to mixing parameters 150 dynamically supplied by the system control unit 200. In a simple system, the mixing parameters 150 can correspond to individual volume or gain controls for each of the other participant stations 110 incoming audio signals.

Figure 3:
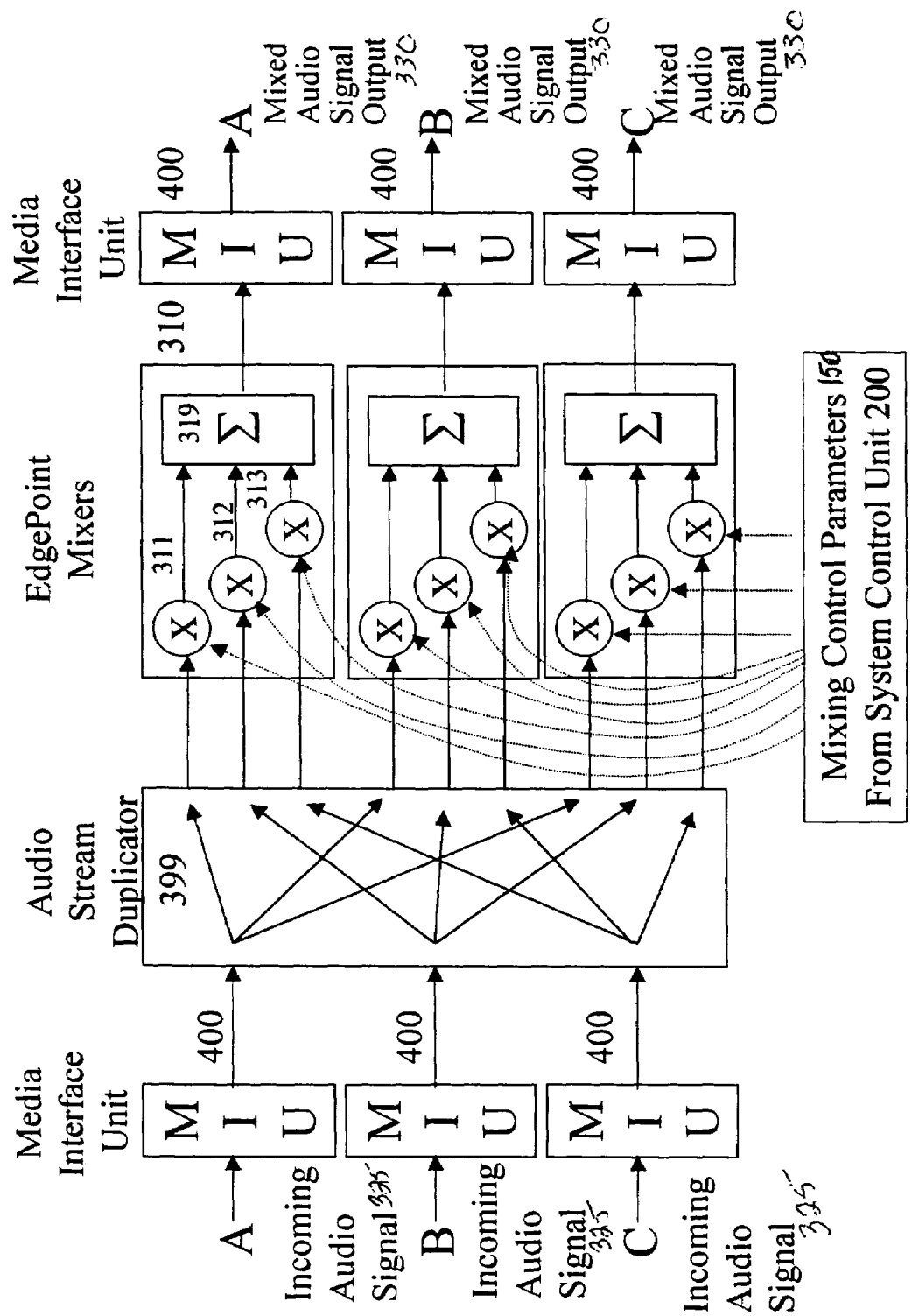
FIG. 3 is a simplified flow diagram corresponding to the system illustrated in FIG. 2.

FIG. 3 illustrates generally the flow of operations of the audio-conference bridging system of FIG. 2. Incoming audio signals 325 are received and transmitted by the audio-conference bridging system 100 by media interface unit (MIU) 400. MIU 400 provides the media interface between the audio bridging unit 300 and whatever network(s) is/are used by the participant stations 110 to send and receive audio signals. The MIU 400 performs functions such as media stream packetization and depacketization, automatic gain control, acoustic echo cancellation (if needed), and lower layer protocol handling (such as RTP and TCP/IP). In one embodiment, incoming audio signals 325 from the participant stations 110 to the audio bridging unit 300 are received through the MIU 400 to the audio stream duplicator 399 where they are duplicated and distributed to each of the EdgePoint mixers 310 for a given conference. As will be discussed, the audio-stream duplicator 399 can be eliminated by appropriate use of matrix multiplication.

In this embodiment, each EdgePoint mixer 310 comprises a group of multiplier functions 311, 312, 313 and an adder function 319. The multipliers 311, 312, 313 multiply each of the respective incoming audio signals 325 by the associated mixing control parameters 150 supplied by the system control unit 200. The adder function 319 then accumulates the scaled incoming audio signals 325 in order to perform the actual mixing and produce mixed audio output signals 330. Again, the mixing control parameters 150 (see FIG. 2) could be simple gain controls in a basic implementation of the system 100. In a more complex implementation, the multiplier functions 311 could be replaced by more complex linear or non-linear functions, either time-varying or non time-varying, in order to create diverse conferencing experiences. For example, the mixing control parameters 150 could be very complex, and could instruct the EdgePoint mixers 310 to introduce effects such as delay, reverb (echo), frequency and phase shifts, harmonics, distortion, or any other acoustical processing function on a per-incoming audio signal basis in order to enhance the conferencing experience.

Figure 4:
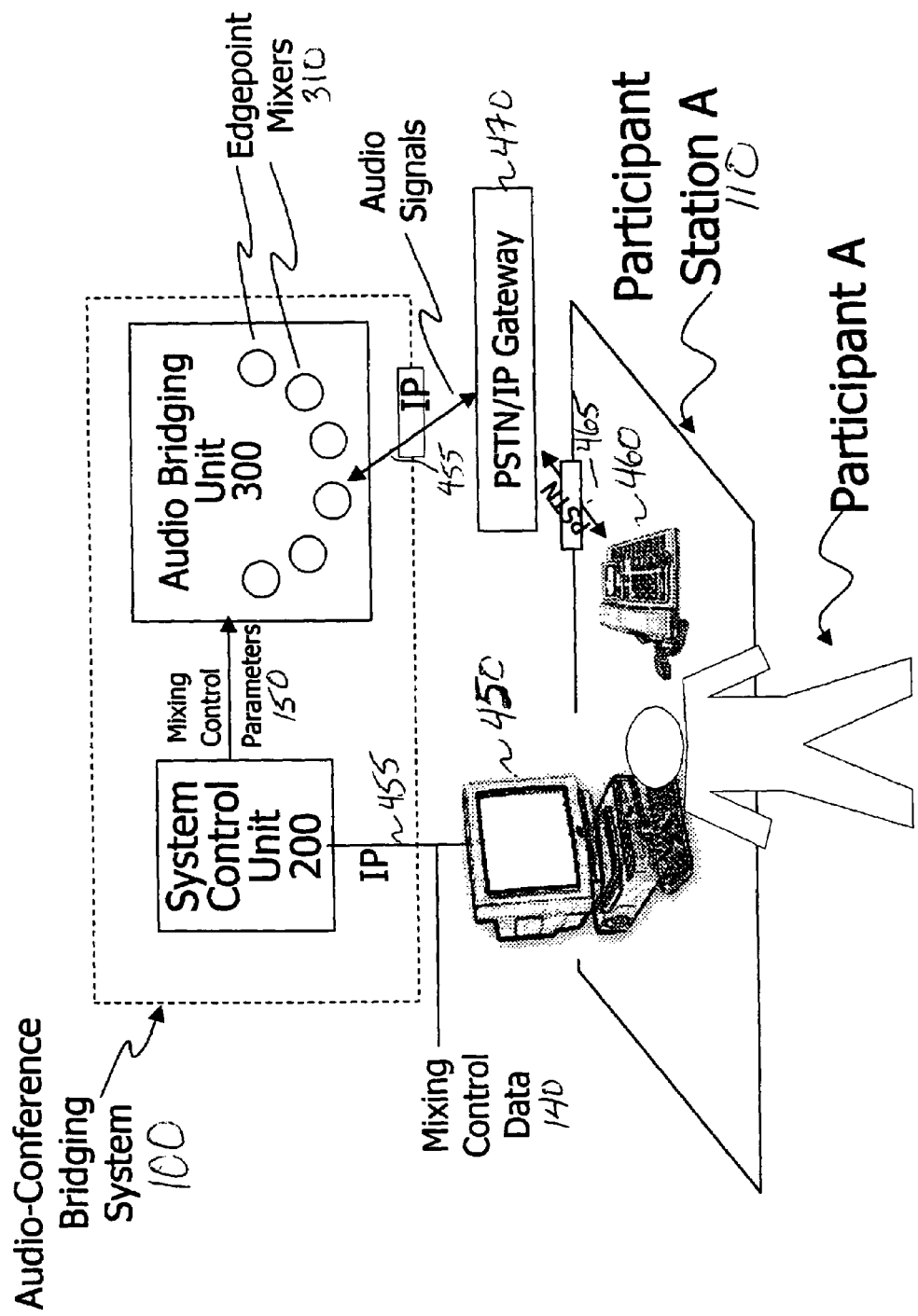
FIG. 4 is a simplified block diagram of the audio-conference bridging system of the present invention and an exemplary embodiment of a participant station.
Figure 5:
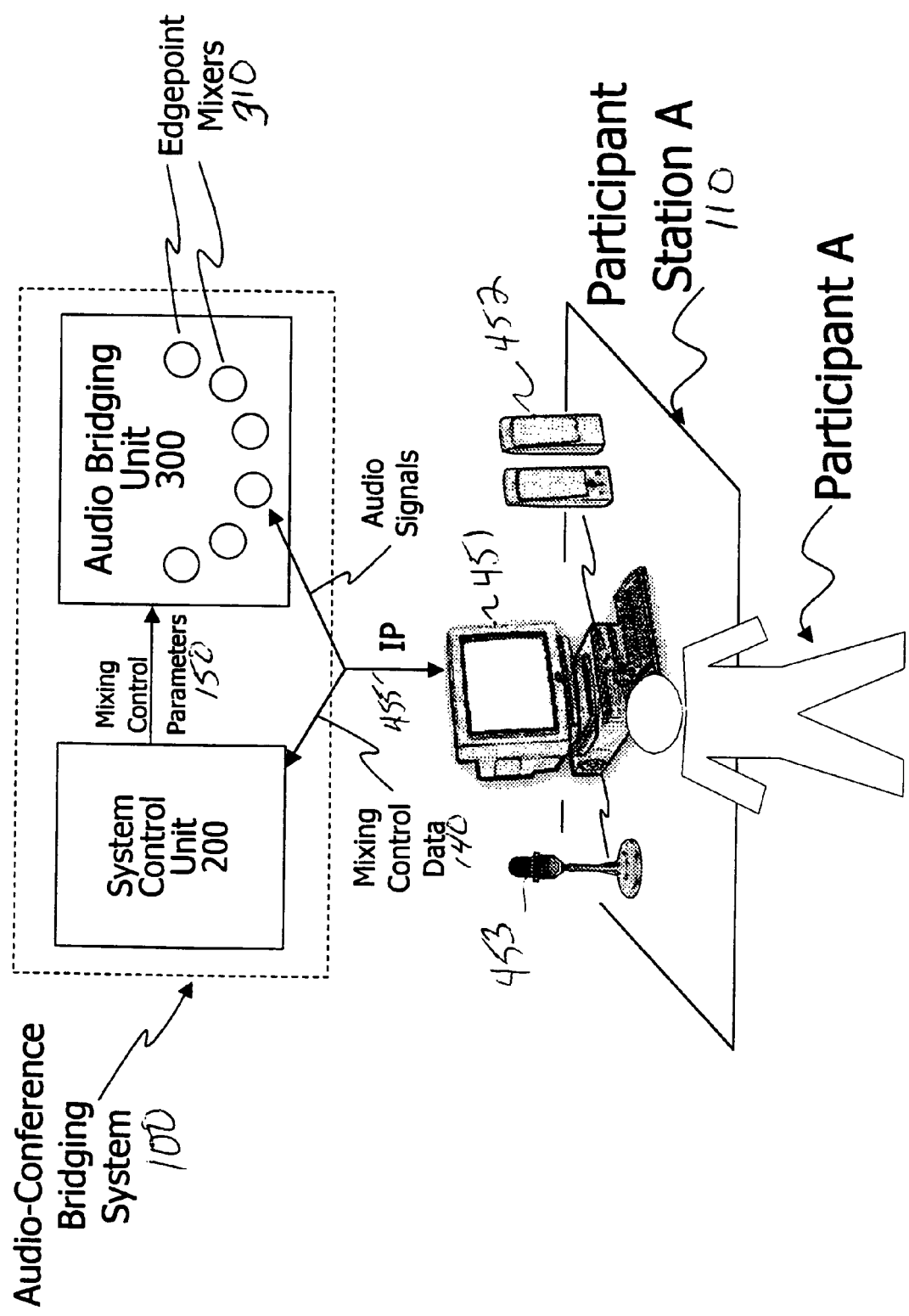
FIG. 5 is a simplified block diagram of the audio-conference bridging system of the present invention and another exemplary embodiment of a participant station.

FIGS. 4 and 5 illustrate preferred embodiments of participant stations 110 to be employed with the audio-conference bridging system of the present invention. The participant stations 110 provide the participants (e.g., A, B, and C) both audio and visual interfaces to the audio-conference bridging system 100.

As shown in FIG. 4, a participant station 110 may comprise a combination of a personal computer (PC) 450 and a standard telephone 460. In this arrangement, the PC 450 preferably has either a low or high-speed connection to a packet-switched network 455 (such as the Internet or a managed IP network) to provide the visual portion of the participant interface and communicate with the system control unit 200. This visual interface (not shown) is preferably comprised of a software application running on the PC 450, such as a Java applet, an interactive gaming program, or any other application adapted to communicate with the system 100 of the present invention. The telephone 460 then provides the audio interface by its connection to the audio bridging unit 300 via the public-switched telephone network (PSTN) 465. This embodiment of the participant station employs an IP-to-PSTN gateway 470 to be implemented in a managed portion of the system's IP network 455 in order to enable an audio connection between the audio bridging unit 300 and the participant station's telephone 460. PSTN/IP gateways 470 are available commercially from Cisco Systems, among others, and can either be colocated with the audio bridging unit 300 or remotely located and connected to the audio bridging unit 300, preferably over a managed IP network 455.

The participant station 110 illustrated in FIG. 4 provides an especially beneficial means for business participants to access the audio-conference bridging system 100 without requiring participants to have: (1) multimedia capabilities on their PC 450; (2) high quality of service on the packet-switched network 455; or (3) special arrangements to allow uniform data packets (UDPs) to bypass a company's network firewall.

FIG. 5 illustrates a different preferred participant station 110, including a multimedia PC 451 with speakers 452 and microphone 453. In this embodiment, the PC 451 preferably has a high-speed connection to a managed IP network 455 to which the audio-conference bridging system 100 is connected, and the audio and visual/control signals are transmitted over the same communication network 455. Preferably, both audio and visual/control signals are transmitted via IP packets with appropriate addressing in the packet headers to direct audio signal information to the audio bridging unit 300 and control information to the system control unit 200.

As used herein, "signal" includes the propagation of information via analog, digital, packet-switched or any other technology sufficient to transmit audio and/or control information as required by the present invention. In addition, "connection" as used herein does not necessarily mean a dedicated physical connection, such as a hard-wired switched network. Rather, a connection may include the establishment of any communication session, whether or not the information sent over such connection all travels the same physical path.

It should be understood that FIGS. 4 and 5 are merely exemplary. Many other participant station configurations are possible, including "Internet phones," PDAs, wireless devices, set-top boxes, high-end game stations, etc. Any device(s) that can, alone or in combination, communicate effectively with both the system control unit 200 and the audio bridging unit 300, can function as a participant station. In addition, those of ordinary skill will recognize that business participants with sufficient bandwidth, firewall clearance, and multimedia PC 451 resources also have the ability (as an option) to apply the "pure-IP" embodiment of FIG. 5. Similarly, this PC 450/telephone 460 combination illustrated in FIG. 4 can be used by nonbusiness participants, and will especially benefit those participants with only narrowband access to an IP network 455 such as the Internet.

Figure 6:
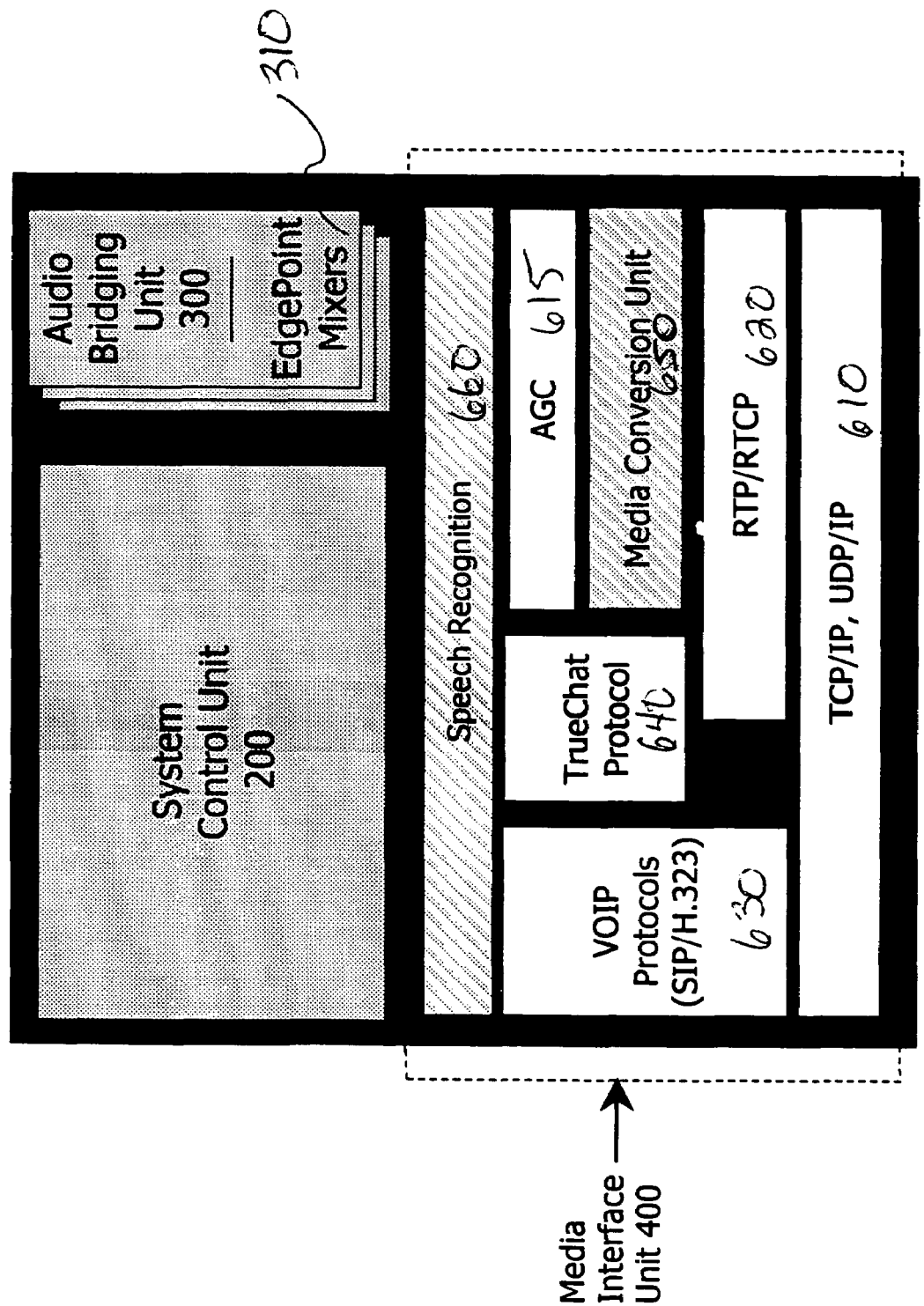
FIG. 6 is a block diagram of an exemplary embodiment of the audio-conference bridging system of the present invention when implemented on a single server.

FIG. 6 illustrates an embodiment of the present invention wherein the audio-conference bridging system 100 is implemented on a single server 600. It will be recognized that some or all of the components described could be distributed across multiple servers or other hardware. This embodiment of the conference server 600 includes three primary components: the system control unit 200, the audio bridging unit 300, and the MIU 400. The conference server 600 may comprise any number of different hardware configurations, including a personal computer or a specialized DSP platform.

The system control unit 200 provides the overall coordination of functions for conferences being hosted on the conference server 600. It communicates with participant stations (e.g., 110 or 110') to obtain mixing control data 140, which it translates into mixing parameters 150 for the audio bridging unit 300. The system control unit 200 may either be fully located within the conference server 600 or it may be distributed between several conference servers 600 and/or on the participant stations 110 or 110').

For example, in a virtual chat-room application, the system control unit 200 can perform distance calculations between the "avatars" (visual representations of each participant) to calculate the amount of voice attenuation to apply to incoming audio signals 325 (see FIG. 3). However, since the position, direction, and speech activity indication vectors for each of the avatars in the chat room are communicated to each of the participant stations 110 anyway (so that they can update their screens correctly), it is feasible to have the participant stations 110 perform the distance calculations instead of a conference server 600.

In fact, the participant stations 110 could calculate the actual mixing parameters 150 and send those to the audio bridging unit 300 (rather than sending position or distance information). Significant benefits to this approach are an increase in server 600 scalability and simplified application-feature development (because almost everything is done on the participant station 110). Drawbacks to such a distributed approach are a slight increase in participant-station processing requirements and an increase in the time lag between an avatar movement on the participant-station screen and the change in audio mixing. The increase in lag is roughly proportional to the time taken to send the participant station 110 all other participants' positional and volume information, although this could be alleviated with so-called dead-reckoning methods. A hybrid approach in which some of the participant stations 110 contain a portion of the system control unit 200 and others do not is also possible.

The audio bridging unit 300 includes the EdgePoint mixers 310 and is generally responsible for receiving incoming audio signals 325 from, and outputting separately mixed signals 330 to, the participant stations 110. The EdgePoint mixers 310 perform audio mixing for the participant stations 110 by mixing a plurality of incoming audio signals 325 in the conference according to mixing parameters 150 dynamically supplied by the system control unit 200. The mixing control parameters 150 supplied for a given EdgePoint mixer 310 are likely to be different from the parameters 150 supplied to any other EdgePoint mixer 310 for a particular conference. Thus, the conferencing experience is unique to each participant in a conference.

In a simple system, the mixing parameters 150 could correspond to simple volume or gain controls for all of the other participants' incoming audio signals 325. Preferably, however, the audio bridging unit 300 will perform a large amount of matrix multiplication, and should be optimized for such. The audio bridging unit 300 also preferably outputs active-speaker indicators (not shown) for each participant station 110—indicating, for each mixed output signal 330, which incoming audio signals 325 are being mixed. The active-speaker indicators may be translated by the participant stations 110 into a visual indication of which participants' voices are being heard at any one time (e.g., highlighting those participants' avatars).

The audio bridging unit 300 contains one or more software processes that could potentially run on either a general-purpose computing platform, such as an Intel-based PC running a Linux operating system, or on a digital signal processor (DSP) platform. The audio bridging unit 300 preferably allocates each participant station 110 in a conference sufficient resources on the conference server 600 to implement one EdgePoint mixer 310. For example, if the conference server 600 is a DSP platform, each EdgePoint mixer 310 could be allocated a separate DSP. Alternatively, a DSP with sufficient processing capacity to perform matrix mathematical operations could accommodate a plurality of EdgePoint mixers 310.

In another embodiment, some or all of the EdgePoint mixers 310 could be distributed to the participant stations 110. This would require, however, that all participant stations 110 broadcast their audio signal inputs 325 to those distributed EdgePoint mixers 310, which is likely to be inefficient without extremely high-speed connections among all participant stations 110. The advantage to having centralized EdgePoint mixers 310 is that each participant station 110 need only transmit and receive a single audio signal.

In the single-server embodiment shown in FIG. 6, it is currently preferred that each EdgePoint mixer 310 be adapted to accept, as inputs, the following information:

- 16-bit pulse code modulated (PCM) uncompanded (i.e., an "uncompressed/unexpanded" transmission) incoming audio signal (325) samples, 8000 samples/sec/participant. Although 8-bit PCM is standard for telephony, a 16-bit requirement allows for the addition of wideband Codecs in the future.
- Attenuation/amplification mixing parameters 150 for all conference participants, updated at a default rate of 10 times/sec. The update rate is preferably a dynamically tunable parameter.
- Other mixing parameters 150 from the system control unit 200 that modify the mixing algorithm, including:
  - Maximum number (N) of simultaneously mixed speakers. The system or the system operator preferably adjusts this parameter in order to optimize performance, or to accommodate the capabilities of each participant station 110.
  - Update rate for attenuation/amplification levels. The system or the system operator preferably adjusts this parameter in order to optimize performance (e.g., 10 times/sec.).
  - Update rate for active-speaker indicators. The system or the system operator adjusts this parameter in order to optimize performance (e.g., 10 times/sec.).
  - Speech Activity Detection (SAD) enable/disable. Each participant station 110 can either enable or disable SAD for their conference experience. If SAD is disabled, then the top N unmuted incoming audio signals 325 will be mixed independent of any thresholds achieved.

Each EdgePoint mixer 310 preferably outputs at least the following data:

- 16-bit pulse code modulated (PCM) uncompanded mixed audio signal (330) speech (sound) samples, 8000 samples/sec for each participant station 110.
- Active speaker indicators identifying current speakers that can be heard (i.e. speakers who are currently being mixed).

Both of the system control unit 200 and the audio bridging unit 300 employ the media interface unit (MIU) 400 to communicate with outside resources, such as the participant stations 110. The MIU 400 is preferably a software module that includes all of the protocols and conversion mechanisms necessary to allow appropriate communication between the conference server 600 and the participant stations 110. For example, the MIU 400 performs traditional audio processing functions of coding/decoding 610, automatic gain control 615, and packet packing/unpacking 620. It also performs protocol processing for the voice-over IP (VoIP) protocol 630 in use for a particular conference. As with the system control unit 200 and the audio bridging unit 300, the MIU 400 can be distributed among different servers 600 in a network.

Real-time protocol (RTP) and real-time control protocol (RTCP) 620 are the standard vehicle for the transport of media in VoIP networks. The MIU 400 packs and unpacks RTP input and output streams for each of the conference participant stations 110. RTP handling 620 is preferably a function included with the VoIP protocol stack 630. In addition, it is preferred that compressed RTP is used to send VoIP media, so as to limit the header-to-data ratio and increase throughput.

It is preferred that IP routing be accomplished by the system set forth in U.S. Pat. No. 5,513,328, "Apparatus for inter-process/device communication for multiple systems of asynchronous devices," which is herein incorporated by reference. The system described therein uses processing resources efficiently by adhering to an event-driven software architecture, and allows efficient extensibility to new plug-in applications (such as the audio-conference bridging system of the present invention).

A preferred foundation of communications for the audio-conference bridging system is the Internet Protocol (IP). Within the umbrella of this protocol, sub-protocols (e.g., Transmission Control Protocol (TCP), User Datagram Protocol (UDP)), and super-protocols (e.g., RTP, RTCP) are employed as needed. The MIU 400 also supports standard VoIP protocols 630, preferably Session Initiated Protocol (SIP) and H.323. However, any VoIP protocol 630 may be used. VoIP protocol stacks 630 are commercially available from Radvision and numerous other companies.

To communicate with the participant stations, the system control unit 200 preferably uses a custom protocol (identified in FIG. 6 as "TrueChat Protocol") 640 translatable by the media interface unit 400. As will be recognized by those of skill in the art, TrueChat protocol 640 is application-dependent and comprises simple identifiers, such as attribute value pairs, to instruct the system control unit 200 how to process information coming from the participant stations 110 and vice versa. TrueChat protocol 640 may be encapsulated in RTP, with a defined RTP payload header type. This is appropriate since the TrueChat protocol 640, although not bandwidth intensive is time-sensitive in nature. Encapsulating the protocol in RTP takes advantage of quality of service (QoS) control mechanisms inherent in some VoIP architectures, such as CableLabs Packet Cable architecture, by simply establishing a second RTP session.

The MIU also includes a media conversion unit 650. The audio bridging unit 300 preferably accepts 16-bit linear incoming audio signals 325. Standard telephony Codecs (G.711) and most compressed Codecs, however, are non-linear to one degree or another. In the case of G.711, a non-linear companding function is applied by the media conversion unit 650 in order to improve the signal to noise ratio and extend the dynamic range. For telephony type Codecs, in order to supply the audio bridging unit 300 with linear Pulse Code Modulation (PCM) speech samples, the media conversion unit 650 converts the incoming audio signal 325 first to G.711, and then applies the inverse companding function, which is preferably accomplished through a table look-up function. For outgoing mixed audio signals 330, the media conversion unit 650 performs the opposite operation. The media conversion unit 650 thus preferably includes transcoders capable of translating a variety of different Codecs into 16-bit linear (such as PCM) and back again.

As discussed, the present invention is preferably implemented over a managed IP network 455 (FIG. 5); however, even highly managed IP networks 455 with (QoS) capabilities are susceptible to occasional packet loss and out of order arrivals. Because voice communications are extremely sensitive to latency, retransmission of a lost packet is not a viable remedy for data transmission errors. From an application perspective, forward error correction (FEC) is a viable solution to the problem; however, FEC requires the continuous transmission of duplicate information—an expensive operation both from a bandwidth and processing perspective. As a compromise solution, most VoIP applications are moving towards receiver-based methods for estimating the speech samples lost due to packet delivery problems. In the case of one missing sample, simple algorithms either repeat the last sample or linearly interpolate. If multiple samples are missing, then more aggressive interpolation methods should be taken, such as the interpolation method recommended by ETSI TIPHON. For example, the method defined in ANSI T1.521-1999 is appropriate for handling G.711 codecs.

The MIU 400 also preferably includes automatic gain control (AGC) 615 with echo cancellation. The AGC 615 is applied to mixed audio signals 330 output from the audio bridging unit 300. The AGC 615 is applied before the conversion to G.711 or other Codec. The AGC 615 also preferably normalizes the output from the audio bridging unit 300 from 16 bits to 8 bits for standard telephony Codecs.

The MIU also preferably includes a speech recognition module 660. As will be discussed, speech recognition 660 can be used in conjunction with the present invention to implement certain mixing policies (such as filter out vulgarities uttered by other participants). Existing speech-recognition software, such as Via Voice available from IBM, can be employed.

Figure 7:
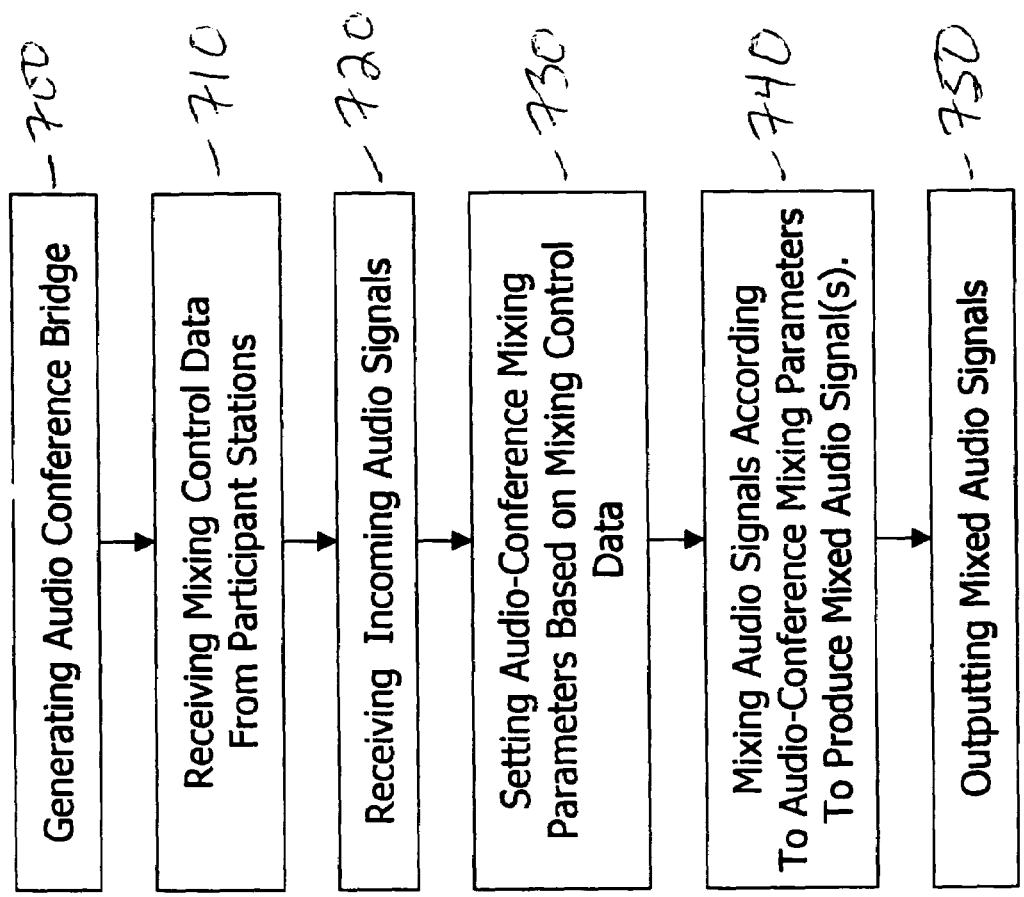
FIG. 7 is a flow chart setting forth basic steps of the method of the present invention.

FIG. 7 illustrates the basic method of the present invention, which will be described with relation to the system described in FIGS. 2 and 3. First, the audio-conference bridging system 100 dynamically generates 700 an audio conference bridge, which is preferably a software process running on a server and comprising a system control unit 200 and an audio bridging unit 300. In a preferred embodiment shown in FIGS. 2 and 3, this is accomplished as follows. Participant stations 110 independently establish a control session with system control unit 200. The system control unit 200 provides each participant station 110 with a session identifier, or SID, unique to that participant station 110. It also provides the SIDs to the audio bridging unit 300 and informs that unit 300 that the SIDs are grouped in the same conference. In implementing this function, it may be beneficial to express the SIDs in terms of conference ID and participant station ID to guarantee uniqueness and to also simplify the process of correlating a particular SID with a particular conference. Alternatively, the SID can comprise simply the IP address and port address of the participant station 110.

After establishment of the control session, each of the participant stations 110 establishes an audio connection with the audio bridging unit 300 and communicates the appropriate SID. The SID can be communicated either automatically by the participant station 110 or manually by the participants (A,B,C) after prompting by the audio bridging unit 300. For example, someone using a participant station 110 such as that depicted in FIG. 4 may need to use his/her telephone 460 to connect to the audio bridging unit 300 and manually provide his/her SID to the audio bridging unit 300 via Dual Tone Multi Frequency (DTMF) tones. From this point until the end of the conference, the SID is used as a reference by the system control unit 200, which sends the SID with mixing control parameters 150 to the audio bridging unit 300. This allows the audio bridging unit 300 to correlate incoming audio signals 325 from the various participant stations 110 to the appropriate EdgePoint mixer 310 and to apply the appropriate mixing parameters 150.

Next, the system control unit 200 receives 710 mixing control data 140 for the participant stations 110. The mixing control data 140 for each participant station 110 includes data used by the system control unit 200 to derive individual mixing parameters 150 to be applied to at least two (and preferably all) of the incoming audio signals 325 from the other participant stations 110. The configuration of mixing control data 140 can take many forms depending on the conferencing application and the level of distributed control on the participant stations 110. In a virtual-chat room example, the mixing control data 140 received from each participant station 110 may be the coordinates of that participant's avatar within the virtual conference world. In another example, mixing control data 140 may comprise simply a notification that the participant station 110 has turned on the "parental control" function (i.e., vulgarity filtering). In still another example, mixing control data 140 may comprise an explicit mixing instruction from the participant (e.g., raise the volume on participant C's incoming audio signal 325).

In general, however, the term "mixing control data" 140 includes any information used to calculate mixing control parameters 150. As discussed, in some instances, the participant stations 110 may be enabled to calculate their own mixing parameters 150, in which case the mixing control data 140 are defined as the parameters 150 themselves. Further, it should be understood that the final mixing control parameters 150 calculated by the system control unit 200 may be dependent on data from other system resources (such as an alert from the speech recognition module 660 in the MIU 400 that a particular participant uttered a vulgarity).

As the system control unit 200 receives mixing control data 140, the audio bridging unit 300 receives 720 incoming audio signals 325 from the participant stations 110. The system control unit 200 then sets 730 the mixing control parameters 150 for each of the EdgePoint mixers 110 based on at least the mixing control data 140 received for the respective participant stations 110. Preferably, the mixing control parameters 150 are set (and periodically revised) according to a three-tiered control system. First, default mixing parameters are set according to an algorithm, such as distance-based attenuation in a virtual chat room. The algorithm-determined mixing parameters can then be automatically altered according to a system-set or participant-set policy, such as muting of vulgar speakers. Finally, the algorithm and/or policy can be overridden by an explicit participant request, such as a request to amplify the voice of a particular speaker.

For example, in a three-dimensional conferencing application, a relevant default algorithm may seek to recreate the realistic propagation of sound in the simulated three-dimensional environment. In this case, the mixing control data 140 received from each of the participant stations 110 may comprise that participant's location within the virtual environment and the direction he/she is facing (because both hearing and speaking are directional). In operation, each participant station 110 periodically updates the system control unit 200 with that participant's current location and direction so that the mixing control parameters 150 can be updated. The system control unit 200 takes this information, applies it against the mixing algorithm to calculate appropriate mixing control parameters 150 for each participant station's designated EdgePoint mixer 316, and then sends the parameters 150 to the audio bridging unit 300 so that the mixing is performed properly. Proper correlation of the participant's location information, the mixing control parameters 150, and the appropriate EdgePoint 310 mixer is accomplished by means of the aforementioned SID.

The distance-based attenuation algorithm of this example can then be automatically altered by enforcement of a system or participant policy. For example, if the particular participant station's policy is to filter certain vulgar language from the conference, that participant station's "parental control" flag is set and notification is sent to the system control unit 200 as part of that participant station's mixing control data 140. The MIU 400 is loaded with a set of offensive words to search for utilizing the speech recognition module 660. Whenever an offensive word is detected, the MIU 400 informs the system control unit 200 which, in turn, temporarily (or permanently, depending on the policy) sets the attenuation parameter for the offensive speaker to 100%, thereby effectively blocking the undesired speech.

This attenuation takes place whether or not the underlying algorithm (in this case, a distance-based algorithm) otherwise would have included the offensive-speaker's voice in the participant's mixed audio signal output 330. Preferably, this attenuation affects only the participant stations 110 that have such a policy enabled. Participants who do not have the policy enabled hear everything that is said. In some applications, a system administrator may want to automatically filter vulgarity from all participant stations 110 (e.g., a virtual chat room aimed at children). Many other types of system and participant policy implementations are enabled by the subject invention and will be readily evident to those having ordinary skill in the art.

The default mixing algorithm can also be directly overridden by mixing control data 140 comprising explicit mixing instructions from the participant stations 110. Explicit mixing instructions can temporarily or permanently override certain aspects of the algorithm calculation being performed by the system control unit 200. For example, a participant could request that another participant in the conference be amplified more than would be dictated by the mixing algorithm. This would be useful if one wanted to eavesdrop on a distant conversation in a three-dimensional chat room, for example. A similar request could place the participant station 110 in a whisper or privacy mode so that other participants could not eavesdrop on his or her conversation. Many other types of participant control requests are enabled by the subject invention and it will be readily evident to those having ordinary skill in the art. In addition, as discussed, the mixing control parameters 150 can be more complicated than simple, linear coefficients and may include certain nonlinear functions to create effects such as distortion, echo, etc.

Mixing control data 140 can also include information used to optimize the maximum number of incoming audio signals 325 mixed for any particular participant station 110. As discussed, participant stations 110, in operation, will have varying qualities of both equipment and connection to the present audio-conference bridging system 100. For example, the participant station 110 illustrated in FIG. 4 includes an audio interface of a telephone 460 connected to the audio bridging unit 300 over the PSTN 465. In the event the telephone 460 and/or PSTN 465 are limited in fidelity, the present invention preferably reduces the maximum number of incoming audio signals 325 that can be mixed for that participant station 110 (e.g., mixing the top three incoming audio signals 325, while the top eight incoming audio signals are mixed for other participants).

A pure-IP participant station 110 (e.g., FIG. 5) with a high-powered multimedia PC 451, full stereo speakers 452, and a high-speed access to a managed IP network 455 may be able to mix a very large number of voices effectively, whereas a low-fidelity participant station 110 (e.g., FIG. 4) may not be able to do so. The present system 100 allows for complete flexibility, however, even within the same conference. The high-powered user will have a full fidelity experience, and the low-end user will not, but both will get the most out of their equipment and network connection and will receive the service they expect given those factors. This is a significant advantage in that it allows all different qualities of participant stations 110 to join the same conference and have different, but equally satisfying experiences.

Preferably, this fidelity adjustment for each participant station 110 can be an algorithm implemented by the system control unit 200. The system control unit 200 preferably determines (automatically or with input from the user) the optimum, maximum number of incoming audio signals 325 to mix for that participant station 110. In one embodiment, the relevant mixing control data 140 comprises an explicit instruction from the participant station 110. For example, the application running at the participant station 110 may provide suggestions to the participant of how to set this parameter based on connection speed, audio equipment, etc. This parameter can also be dynamically modified during the conference, so the participant can change the maximum number of incoming signals 325 mixed if he/she is not satisfied with the original setting. In another embodiment, the system control unit 200 can optimize the maximum number of mixed incoming signals 325 for each participant station 110 by automatically gathering mixing control data 140 through monitoring of network conditions, including network jitter, packet loss, quality of service, connection speed, latency, etc.

Once the mixing control parameters 150 are calculated, they are sent by the system control unit 200 to the audio bridging unit 300. The audio bridging unit 300 then uses the EdgePoint mixers 310 to mix 740 the incoming audio signals 325 according to each participant station's mixing control parameters 150. Each participant station 110 is allocated a separate EdgePoint mixer 310, and the system control unit 200 sends the SID for that participant station 110 with the mixing control parameters 150 to allow proper correlation by the audio bridging unit 300.

A preferred method of mixing will be described with reference back to the configuration of FIG. 3. For simplicity, assume a very straightforward mixing algorithm that mixes all voices according to dynamically updated attenuation values explicitly supplied by the participant stations 110. In addition, assume the following labels for the various input signals and output signals in FIG. 3:

SI (1)=Incoming audio signal from participant station A
SI (2)=Incoming audio signal from participant station B
SI (3)=Incoming audio signal from participant station C
SO (1)=Mixed audio signal output to participant station A
SO (2)=Mixed audio signal output to participant station B
SO (3)=Mixed audio signal output to participant station C
A (1,1)=Amplification chosen by participant A for his/her own input signal (this will usually be zero, unless the virtual environment included some echo).
(1,2)=Amplification chosen by participant A for participant B's input signal.
A (1,3)=Amplification chosen by participant A for participant C's input signal.
A (2,1)=Amplification chosen by participant B for participant A's input signal.
A (2,2)=Amplification chosen by participant B for his/her own input signal (this will usually be zero, unless the virtual environment included some echo).
A (2,3)=Amplification chosen by participant B for the participant C's input signal.
A (3,1)=Amplification chosen by participant C for the participant A's input signal.
A (3,2)=Amplification chosen by participant C for participant B's input signal.

A(3,3)=Amplification chosen by participant C for his/her own input signal (this will usually be zero, unless the virtual environment included some echo).

The formulas for the output signals can then be simply stated as functions of the input signals:

$$SO(1)=A(1,1)SI(1)+A(1,2)*SI(2)+A(1,3)*SI(3)$$

$$SO(2)=A(2,1)*SI(1)+A(2,2)*SI(2)+A(2,3)*SI(3)$$

$$SO(3)=A(3,1)*SI(1)+A(3,2)*SI(2)+A(3,3)*SI(3)$$

This calculation can be accomplished as a simple matrix operation. For example, if SI represents the input column vector of participants' input signals 325, A represents the amplification matrix, and SO represents the output vector of mixed audio signal outputs 350, then:

SO=A×SI, where the 'x' is used to signify a matrix multiplication.

It should be understood that the incoming audio signals 325 are always changing, and the amplification matrix is periodically updated, so this calculation represents only a single sample of the outgoing mixed audio signal 330. For typical PCM-based Codecs, such as G.711, this operation would be performed 8000 times/sec. Note also that by implementing the EdgePoint mixing computation as a matrix operation, the need for an explicit stream duplicator 399 (FIG. 3) is eliminated.

The example above assumes a small number of participant stations 110 and a simple mixing algorithm. In a more complex embodiment, however, there will typically be more than three participant stations 110 per conference and the mixing algorithm can be considerably more complex. Thus, the EdgePoint mixing computation is preferably optimized to limit computational overhead. For example, assume that a relatively large chat room has fifty participant stations 110, all highly interactive, and that the default mixing algorithm mixes up to eight speakers. First, the audio-conference system 100 must determine which incoming audio signals 325 should be mixed for each participant station 110. Then the mixing calculation must be optimized so as to reduce the complexity of the matrix operations involved.

The preferred real-time inputs to the audio bridging unit 300 are the amplification matrix (A) from the system control unit 200 and the PCM speech sample vector (SI) taken from the incoming audio signals 325 received through the media interface unit 400. Two simple steps can be used in combination to determine which speakers should be mixed. The first step utilizes speech activity detection (SAD) to determine current active speakers as a means of reducing the number of possibilities, and the second evaluates signal strength and amplification value to choose the top N sources for mixing.

The first step in this preferred process, then, is to periodically compute the SAD values for the incoming audio signals 325. Speech activity detection algorithms are relatively standard building blocks and will not be described here; however, an SAD is preferably implemented as part of the MIU 400 in conjunction with the media conversion unit 650. Relative to the frequency of incoming speech samples (e.g., 8000/sec), speech activity detection is relatively static (e.g., 10 updates/sec). The output of an SAD function is typically a Boolean value (0 or 1). Since many of the incoming audio signals 325 will be non-active (i.e., silent or producing only low-level noise), the number of columns in the amplification matrix (A) and the number of rows in the speech input vector (SI) can be quickly reduced, thereby achieving a significant reduction in the amount of matrix computation required. These reduced matrices will be referred to as (a) and (si), respectively.

Optimally, a second step in this preferred process can be used to order the amplified incoming signals 325 according to their strength (per participant station 110), and then to sum only the top N signals for the final mixed signal output 330 to that participant station 110. The amplified signals chosen for final summing may vary for each participant station 110. This means that the matrix multiplication of the reduced amplification matrix (a) and input signal vector (si) is further reduced to a series of modified vector dot products, where each row is computed separately, instead of as a single matrix multiplication. The vector dot products are modified because there is a sorting process that takes place before the final addition. Preferably, then the audio bridging unit 300 performs multiplication associated with the dot product and a descending sort until the top N (e.g., 8) values are obtained. The top N values are then summed to get the desired output mixed signal 330.

Once the incoming audio signals 325 are appropriately mixed 740 according to the mixing control parameters 150, a separate mixed audio signal 330 is output 750 from the audio bridging unit 300 to each participant station 110. The output 750 of the mixed audio signals 330 will ordinarily involve the audio bridging unit 300 transmitting the mixed audio signals 330 to the respective participant stations 110 across a communications network. However, in the embodiment where some of the audio bridging unit 300 is distributed at the participant station 110 (such that some participant stations 110 include their own EdgePoint mixers 310), the step of outputting 750 may involve simply sending the mixed audio signal 330 to an attached speaker.

Figure 8:
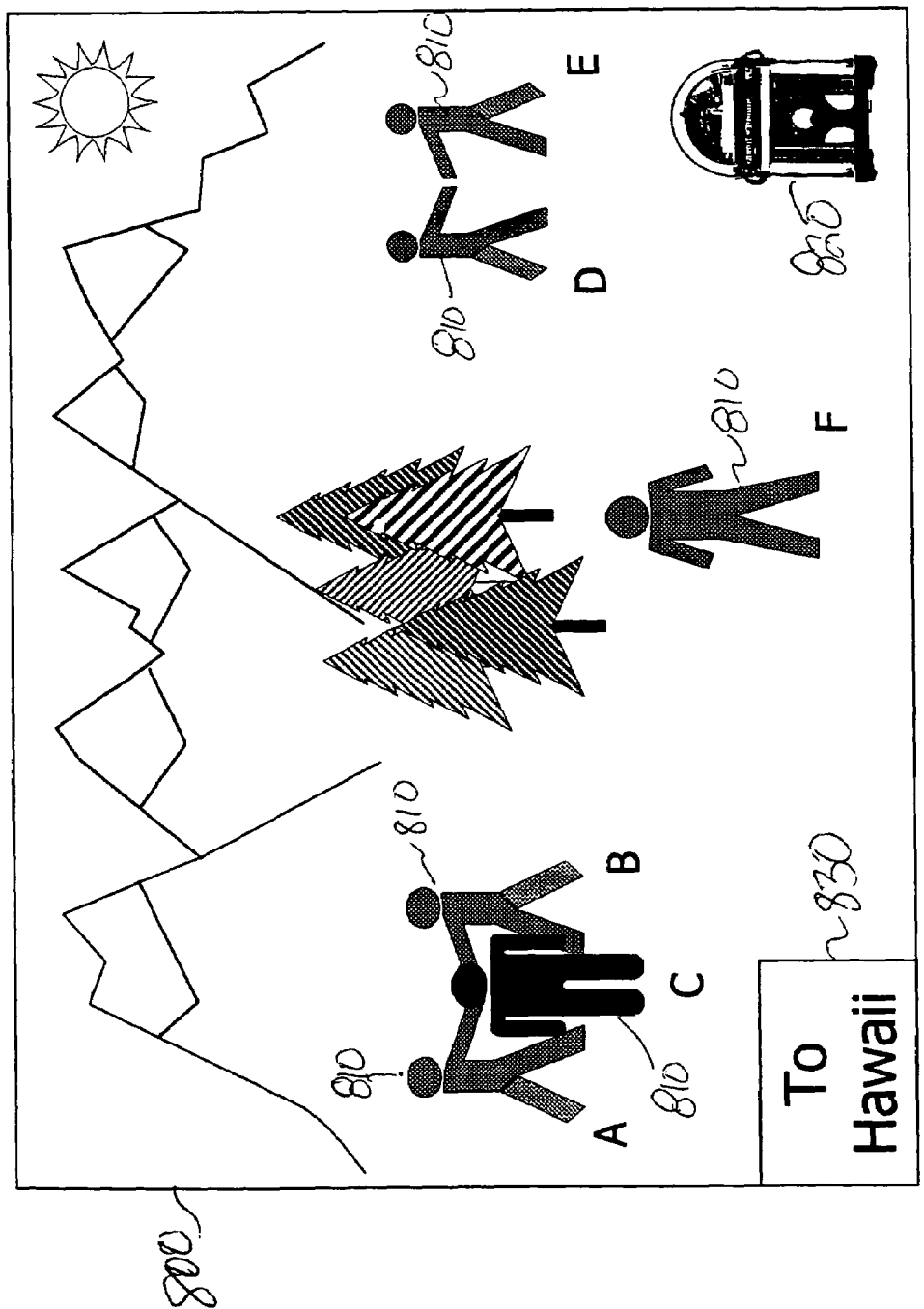
FIG. 8 is an exemplary illustration of a potential visual interface for a virtual chat room enabled by the present invention.

FIG. 8 illustrates an example of a possible visual interface for a virtual chat room 800 utilizing the audio-conference bridging system 100 of the present invention. The exemplary application illustrated in FIG. 8 depicts a two-dimensional virtual chat room 800 in which avatars 810 representing participants A–F are located. This particular chat room 800 shows a mountain scene and might be appropriate for discussions of outdoor sports and the like. In addition to the participants, FIG. 8 includes icons for a jukebox 820 and a hypertext link 830 to a separate virtual chat room—in this case a chat room with a Hawaiian theme. This chat room 800 may be an Internet web site hosted on the same server 600 as the system control unit 200 and audio bridging unit 300. In this embodiment, the visual interface of the chat room 800 may be provided to the participant stations 110 by a Java applet running on the participant stations 110. It will be recognized that a nearly infinite variety of other visual interfaces are possible. The chat room 800 shown here, however, will be used in conjunction with FIG. 9 to describe an exemplary virtual chat session using the audio-conference bridging system 100 of the present invention.

Figure 9:
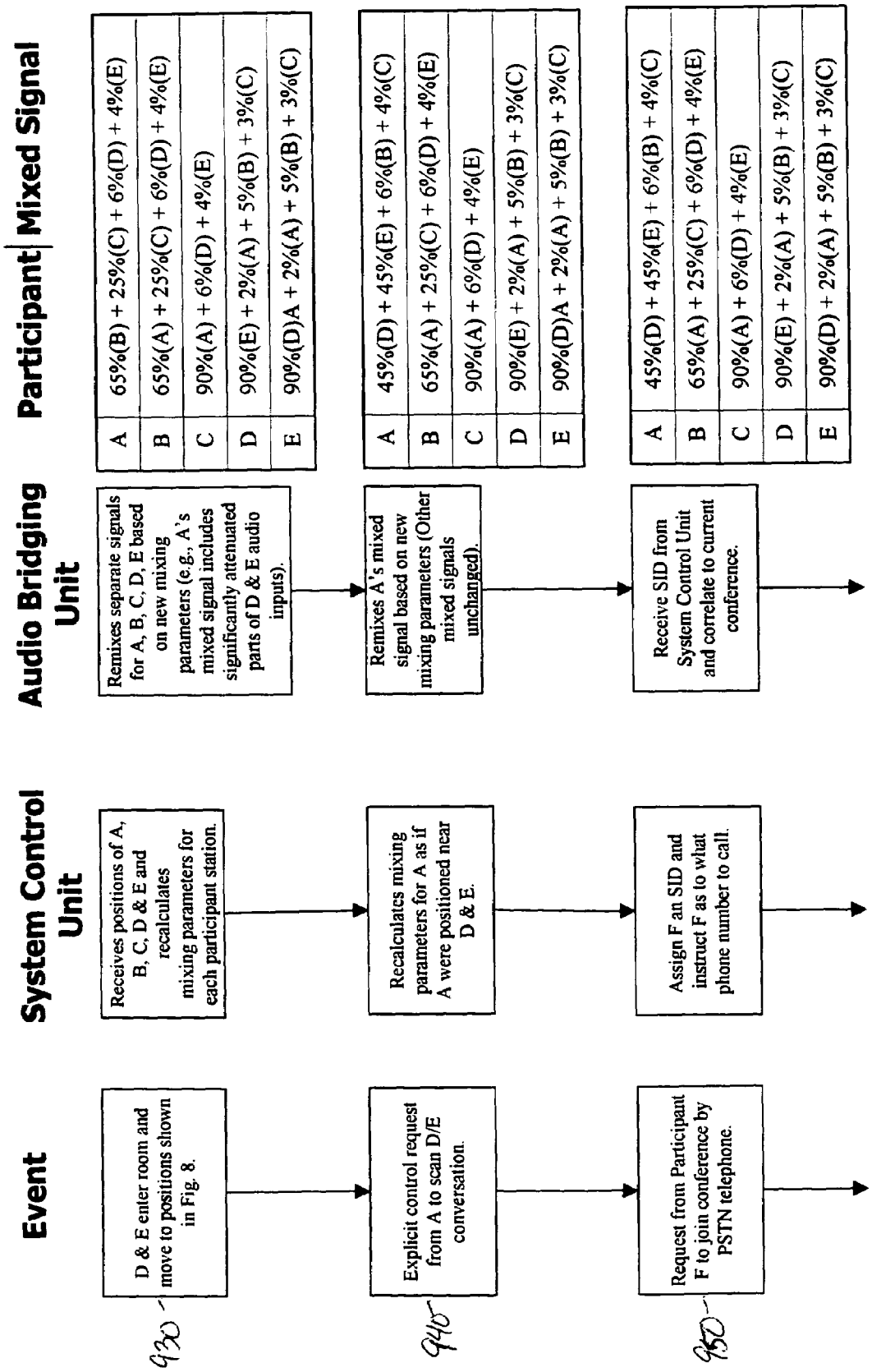
FIG. 9 is an event diagram illustrating particular events taking place within the virtual chat room of FIG. 8 and exemplary responses of the present system thereto.
Figure 9:
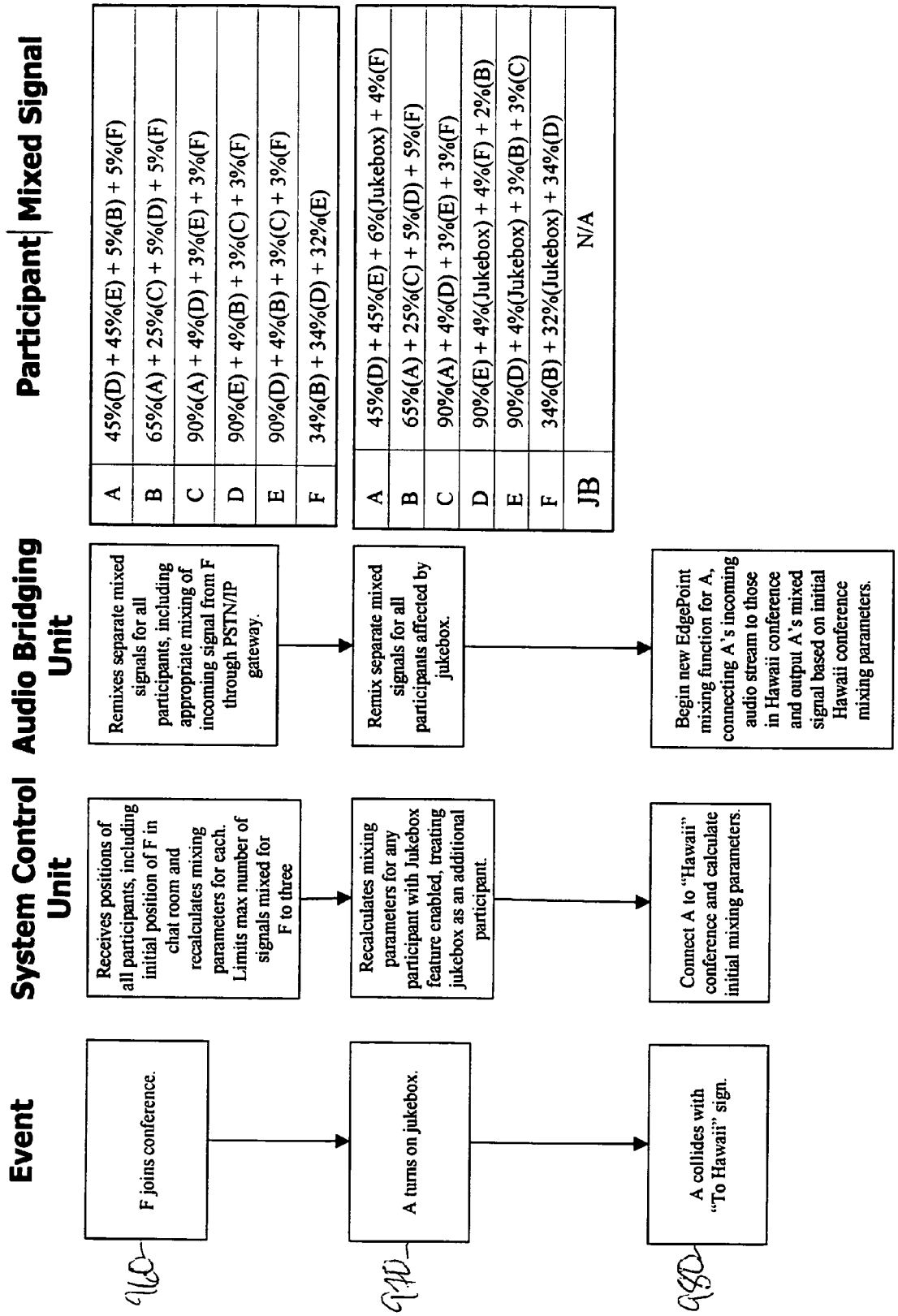

FIG. 9 is an event chart illustrating an exemplary chat session in the virtual chat room illustrated in FIG. 8. As discussed, many mixing algorithms are possible. In a virtual chat-room application 800, for example, the relevant mixing algorithm may attempt to recreate a realistic, distance-based propagation of sound in the simulated environment. That environment may be two- or three-dimensional. In the three-dimensional case, the mixing control data 140 sent by each participant station 110 may include his/her location within the room, the direction he or she is facing, as well as the tilt of his/her head (should that be the visual paradigm, such as in avatar games and virtual environment applications). Armed with this information, the system control unit 200 calculates mixing control parameters 150 that will output mixed audio signals 330 from the audio bridging unit 300 that are attenuated based on distance and direction of the speakers (e.g., a speaker who is to the left of the participant's avatar may have his/her voice mixed to be output mainly out of the participant station's left stereo speaker). For simplicity, however, the example illustrated in FIG. 9 assumes a simple, distance-based algorithm, without regard for direction, head-tilt, etc.

The first "event" 900 is that participants A, B, and C are in the room 800 (having already established a conference session). Although FIG. 8 is not drawn to scale, assume initially that A, B, and C are equidistant from one another. In addition, the following initial assumptions are made: (1) none of participants D, E, & F are initially in the room 800; (2) all participants are assumed to be speaking continuously and at the same audio level; (3) only participant C has parental controls (i.e., vulgarity filtering) enabled; (4) the default maximum number of incoming audio signals that can be mixed at any one time is 4 (subject to reduction for lower-fidelity participant stations).

While participants A, B and C are in the room 800, their participant stations 110 periodically update the system control unit 200 with mixing control data 140, including their positions within the room 800. (For purposes of this discussion, the positions of the participants' avatars 810 are referred to as the positions of the participants themselves.) The system control unit 200 applies the specified mixing algorithm to the mixing control data 140 to calculate mixing parameters 150 for each participant station 110. The audio bridging unit 300 then mixes separate output signals 330 for each of the participant stations 110 based on their individual mixing parameters 150. In this case, because participants A, B, and C are equidistant from one another and a simple, distance-based mixing algorithm is being applied, each participant station 110 receives an equal mix of the other two participants' inputs (e.g., A's mixed signal=50% (B)+50% (C)).

It should be understood that the percentages shown in FIG. 9 are component mixes of the incoming audio signals 325. They are not necessarily, however, indications of signal strength. Rather, in this embodiment, gain is still a function of distance between avatars 810 and speaker volume input. In one embodiment, gain decreases as a square of the distance between avatars 810 increases (roughly true in the real world). In some applications, however, it may be advantageous to employ a slower rate of distance-based "decay," such as calculating gain as a linear function of proximity between avatars 810. In other embodiments, it may be desirable always to amplify at least one conversation in the virtual chat room 800 to an audible level regardless of the distance between avatars 810. In this embodiment, a simple distance-based algorithm is used and it is assumed that all participants are speaking constantly and at the same incoming levels, so the "top" incoming signals 325 for any particular participant are the three other participants closest in proximity.

Next, participant A moves 910 closer to participant B, while participants A and B remain equidistant from participant C (note—FIG. 8 shows only each participant's starting position). The system control unit 200 receives the updated positions of participants A, B, and C and recalculates mixing control parameters 150 for each participant station 110. The audio bridging unit 300 then remixes the incoming audio signals 325 for each participant station 110 based on the revised mixing control parameters 150 received from the system control unit 200. In this example, it is assumed that the distances among the participants have changed such that participant A now receives a 70%–30% split between the incoming audio signals 325 of B and C, respectively. B receives a similar split between the incoming audio signals 325 of A and C. C, however, still receives a 50%—50% split between the incoming audio signals 325 of A and B since those participants remain equidistant from C.

The next depicted event 920 is that participant B utters a vulgarity. The vulgarity is detected by a speech recognition module 660 within the MIU 400, which notifies the system control unit 200 of the vulgarity contained within B's incoming audio signal 325. Recall that participant C is the only participant with his/her parental controls enabled. The system control unit 200 recalculates mixing control parameters 150 for participant station C and sends those updated parameters 150 to the audio bridging unit 300. The audio bridging unit 300 then temporarily (or permanently depending on the policy in place) mutes B's incoming signal 325 from C's mixed signal 330. It is assumed here that B's incoming signal 325 is permanently muted from C's mixed signal 330. As such, C receives only audio input from participant A. Assuming that the mixing control data 140 from A and B have not changed, the mixed signals 330 output to A and B remain the same (and A would hear the vulgarity uttered by B).

Next, participants D and E enter 930 the room 800 and move to the positions shown in FIG. 8. As previously discussed, in order to enter the room 800, participants D and E will have already established a control session with the system control unit 200 and a media connection to the audio bridging unit 300. Assuming that D and E utilize the "pure IP" participant station 110 illustrated in FIG. 5, participants D and E can seamlessly enter the room 800 without manually entering an SID provided by the system control unit 200.

Once participants D and E enter 930 the room 800, the system control unit 200 receives a periodic update of mixing control data 140, including the positions of all participants. The addition of two more participants causes the system control unit 200 to recalculate mixing parameters 150 for existing participants A, B and C as well as for new participants D and E. The audio bridging unit 300 then remixes the outgoing mixed signal 330 for each participant station 110 based on the new mixing parameters 150. As shown in FIG. 9, in this example, participants A, B and C receive significantly attenuated levels of the incoming audio signals 325 from D and E because participants D and E are a significant distance away (participant E being slightly farther away than participant D). Similarly, participants D and E receive mostly each other's incoming audio signals 325, with significantly attenuated portions of incoming audio signals 325 from participants A, B and C.

Next, participant A explicitly requests 940 to scan the distant conversation of participants D and E. This request can be made in a variety of ways, including by participant A clicking his/her mouse pointer on a space directly between participants D and E. The system control unit receives this request as part of the mixing control data 140 from participant A. The system control unit 200 then preferably recalculates A's mixing control parameters 150 as if participant A were positioned in the spot clicked on by participant A's mouse pointer. For purposes of the remaining participants' mixing of participant A's incoming audio signal 325, A is still considered to be in his previous position, however. The audio bridging unit 300 then remixes participant A's outgoing mixed signal 330 according to the new mixing control parameters 150 (resulting in a mixed signal output 330 to A that is more heavily weighted to the conversation between D and E). Mixed audio signals 330 to other participants are unchanged by this event.

The next depicted event 950 is a request from participant F to join the conference using a participant station 110 like the one shown in FIG. 4 (e.g., a visual PC interface and an audio PSTN telephone interface). Preferably the request from participant F is made via his/her PC 450 or other visual interface. The system control unit 200 receives the request and assigns participant F an SID for the conference and instructs participant F as to what number to call to gain an audio interface. The system control unit 200 also sends the SID to the audio bridging unit 300, which correlates the SID to the current conference and waits for participant F to establish an audio connection. Until participant F actually joins the conference, the mixed audio signals 330 for the existing participant stations 110 do not change.

In one embodiment, participant F establishes an audio connection by calling a toll-free number, which connects participant station F to the audio bridging unit 300 through a PSTN-IP gateway 470. The audio bridging unit 300 then prompts participant F to enter the SID provided by the system control unit 200 (perhaps via DTMF tones). Once the SID is entered, the audio bridging unit 300 dedicates an EdgePoint mixer 310 to participant station F and connects it to the current conference.

Once participant F establishes an audio connection and enters 960 the conference (in the position shown in FIG. 8), the system control unit 200 receives a periodic update of all the participants' positions, including the initial position of participant F within the room 800, and calculates updated mixing control parameters 150 for each participant station 110. Recall that the assumed default maximum number of mixed audio signals for this conference is 4. Because there are now six participants, each participant receives a mixed signal 330 that does not include at least one of the other participant's incoming audio signal 325. For example, because participant C is farthest away from participant A's eavesdropping position (between participants D and E), A's mixed signal 330 does not include any input from C. Similarly, participant B's mixed signal 330 does not include any input from participant E. (Recall that participant A is still considered to maintain his/her position by participants A and B for other participant's mixing purposes despite participant A's eavesdropping.) Participant C, since it has already muted participant B's input because of vulgarity, does not lose any further signal inputs by the addition of participant F.

Assuming, however, that participant F's PSTN connection 465 to the present system 100 is limited in fidelity, the system control unit 200 preferably limits the number of incoming audio signals 325 mixed for participant F to three. Because of fidelity and speed limitations, participant F's audio connection and equipment may not be able to receive clearly, in real time, an outgoing mixed signal 300 with four mixed voices. Therefore, the control system accommodates participant F to the level of fidelity that participant station F can best handle (assumed here to be three mixed incoming audio signals 325). As discussed, this fidelity limit is preferably included as a mixing control parameter 150 from the system control unit 200, based on mixing control data 140 received explicitly from the participant station 110 and/or derived by the system control unit 200 automatically.

Participant A next turns on 970 the jukebox 820 in the corner of the virtual chat room 800. It will be recognized that this virtual jukebox 820 can take many forms, including as a link to a streaming audio service hosted on another server. However the music is imported to the virtual chat room 800, it is preferred that the jukebox 820 be treated simply as another participant for mixing purposes. In other words, participants who are closer to the jukebox 820 will hear the music louder than participants who are farther away. Accordingly, the system control unit 200 factors the jukebox 820 in as the source of another potential incoming audio signal 325 and calculates distance-based mixing control parameters 150 based thereon. The audio bridging unit 300 then remixes separate mixed audio signals 330 for any participants affected by the activation of the jukebox 820. In this case, only participants A (from his/her eavesdropping position), D, E and F are close enough to the jukebox to have the music from the jukebox 820 replace one of the four incoming audio signals 325 that were previously being mixed.

Finally, participant A decides to collide 980 with the "To Hawaii" sign 830 in the corner of the virtual chat room 800. This is an example of a convenient portal into a different chat room (presumably one with a Hawaiian theme). This can be implemented as a hypertext link within the current chat room 800 or by a variety of other mechanisms. A preferred method for dealing with events like the collision of avatars with such links is set forth in U.S. Provisional Application No. 60/139,616, filed Jun. 17, 1999, and entitled "Automatic Teleconferencing Control System," which is incorporated by reference herein.

Once participant A collides 980 with the hypertext link, the system control unit 200 assigns a different SID to participant A and sends that SID to the audio bridging unit 300. The audio bridging unit 300 correlates the SID to the Hawaii conference and connects participant A to that conference with another EdgePoint mixer 310 dedicated for that purpose. The system control unit 200 calculates initial mixing parameters 150 for participant A in the Hawaii conference and send them to the audio bridging unit 300. The audio bridging unit 300 then connects A's incoming audio signal 325 to the other EdgePoint mixers 310 of other participants in the Hawaii conference and mixes the incoming audio signals 325 of the other Hawaii conference participants according to A's mixing control parameters 150.

It will be recognized that the example set forth in FIG. 9 is not exhaustive or limiting. Among other things, the assumption that all participants are speaking at any one time is unlikely. Accordingly, appropriate selection of which incoming audio signals 325 to be mixed will more likely be made in conjunction with the method described in relation to FIG. 7 (including speech activity detection). Moreover, as discussed, the mixing formula can and likely will be considerably more complex than a distance-based attenuation algorithm, selective participant muting, and selective participant amplification for a non-directional monaural application. Logical extensions to this basic mixing formula may add speaking directionality and/or stereo or 3D environmental, directional listening capabilities as well.

In addition, it is likely that the audio-conference bridging system 100 of the present invention will be used in conjunction with the interactive gaming applications. In that case, it may become desirable to add "room effects" to the audio mixing capabilities, such as echo, dead spaces, noise, and distortion. It is also likely that, in addition to the third-person view of the chat room 800 shown in FIG. 8, certain gaming applications will add a first-person view in three-dimensions. As used herein, it should be understood that "avatars" 810 refer to any visual representation of a participant or participant station 110, regardless of whether that representation is made in a first-person or third-person view. Further, for business conferencing or certain entertainment applications, wideband audio mixing can add significant value to the conferencing experience.

In addition, it will be recognized by those of skill in the art that the present invention is not limited to simple audio-conference applications. Other types of data streams can also be accommodated. For example, avatars can comprise video representations of participants. In addition, the present invention can be used to collaboratively work on a document in real-time.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

We claim:

1. A method for facilitating an audio conference, comprising the steps of:
   generating an audio conference bridge operatively connecting participant stations in an audio conference, including at least a first participant station and a plurality of other participant stations, and adapted to receive incoming audio signals from the participant stations;
   receiving first mixing control data for the first participant station, including data necessary to derive individual mixing parameters for at least two of the incoming audio signals from other than the first participant station;
   receiving the incoming audio signals from a plurality of the participant stations;
   setting a first set of audio conference mixing parameters based on at least the first mixing control data received for the first participant station;
   dynamically modifying the first set of audio conference mixing parameters pursuant to an algorithm for creating a desired effect;
   mixing N of the incoming audio signals according to the modified first set of audio conference mixing parameters to produce a first mixed audio signal, where N is an integer greater than one; and
   outputting the first mixed audio signal.

2. The method of claim 1, wherein the step of outputting includes transmitting the first mixed audio signal to the first participant station.

3. The method of claim 1, wherein the first participant station is connected to a first communications network and the audio conference bridge is connected to a second communications network; and wherein the step of generating includes operatively connecting the first participant station to the audio conference bridge via a gateway between the first communications network and the second communications network.

4. The method of claim 3, wherein:
   the first participant station is operatively connected to the second communications network;
   the first participant station receives the first mixed audio signal via the first communications network; and
   the first participant station transmits the first mixing control data via the second communications network.

5. The method of claim 4, wherein the first communications network comprises at least one of: a public switched telephone network; a wireless communications network; and a satellite communications network.

6. The method of claim 4, wherein the second communications network comprises at least one of: the Internet; a wide-area network; and a local-area network.

7. The method of claim 1, wherein the first mixing control data comprises explicit mixing instructions from the first participant station.

8. The method of claim 7, wherein:
   the second participant transmits an audio signal to the audio conference bridge; and the mixing instructions include increasing gain for the audio signal transmitted by the second participant station.

9. The method of claim 7, wherein:
   the second participant station transmits an audio signal to the audio conference bridge; and
   the first mixing control data includes decreasing gain for the audio signal transmitted by the second participant station without completely muting the audio signal transmitted by the second participant station.

10. The method of claim 1, wherein the mixing control data comprises the value of at least a first variable related to the first participant station and the step of dynamically modifying comprises automatically calculating the modified first set of mixing parameters based on the value of at least the first variable.

11. The method of claim 10, wherein at least a first participant associated with the first participant station is visually represented by a first avatar within a virtual conference world, and wherein the first variable comprises the position of the avatar within the virtual conference world.

12. The method of claim 11, wherein the first participant controls the position of the first avatar within the virtual conference world.

13. The method of claim 11, wherein the virtual conference world is three-dimensional.

14. The method of claim 11, wherein:
   at least a second participant associated with the second participant station is visually represented by a second avatar within the virtual conference world;
   the second participant station transmits an audio signal to the audio conference bridge;
   and further comprising the step of:
   revising the first set of audio conference mixing parameters to increase gain for the audio signal transmitted by the second participant station as the first avatar and the second avatar move closer together.

15. The method of claim 2, wherein the other participant stations include at least a second participant station, and further comprising the steps of:
   receiving second mixing control data from the second participant station including data necessary to derive individual mixing parameters for at least two of the incoming audio signals from participant stations other than the second participant station;
   setting a second set of audio conference mixing parameters based on at least the second mixing control data;
   dynamically modifying the second set of audio conference mixing parameters pursuant to the algorithm;
   mixing N of the incoming audio signals according to the modified second set of audio conference mixing parameters to produce a second mixed audio signal, where N is an integer greater than one; and
   transmitting to the second participant station the second mixed audio signal;
   wherein the first set and second set of modified audio conference mixing parameters are distinct.

16. The method of claim 1, wherein the step of dynamically modifying includes monitoring the content of the incoming audio signals and automatically altering the first set of audio conference mixing parameters if preset events are detected in the content of the audio signals.

17. The method of claim 16, wherein the preset events include offensive language.

18. The method of claim 1, wherein the step of generating includes;
establishing a control connection with the first participant station;
assigning a session identifier to the first participant station;
establishing an audio connection with the first participant station; and
correlating the control connection and the audio connection via the session identifier.

19. The method of claim 1, wherein the modified first set of audio conference mixing parameters includes a parameter limiting the maximum number N of incoming signals mixed to produce the first mixed audio signal.

20. An audio conference bridging system for bridging a plurality of participant stations together in an audio conference, comprising:
means for generating an audio conference bridge operatively connecting participant stations in an audio conference, including at least a first participant station and a plurality of other participant stations, and adapted to receive incoming audio signals from the participant stations;
means for receiving first mixing control data for the first participant station, including data necessary to derive individual mixing parameters for at least two of the incoming audio signals from other than the first participant station;
means for receiving incoming audio signals from a plurality of the participant stations;
means for setting a first set of audio conference mixing parameters based on at least the first mixing control data received for the first participant station;
means for dynamically modifying the first set of audio conference mixing parameters pursuant to an algorithm for creating a desired effect;
means for mixing N of the incoming audio signals according to the modified first set of audio conference mixing parameters to produce a first mixed audio signal, where N is an integer greater than one; and
means for outputting the first mixed audio signal.

21. A computer-readable medium containing instructions for controlling a computer system to facilitate an audio conference process among a plurality of participant stations, the process comprising:
generating an audio conference bridge operatively connecting participant stations in an audio conference, including at least a first participant station and a plurality of other participant stations, and adapted to receive incoming audio signals from the participants stations;
receiving first mixing control data for the first participant station, including data necessary to derive individual mixing parameters for at least two of the incoming audio signals from other than the first participant station;
receiving incoming audio signals from a plurality of the participant stations;
setting a first set of audio conference mixing parameters based on at least the first mixing control data received for the first participant station;

dynamically modifying the first set of audio conference mixing parameters pursuant to an algorithm for creating a desired effect;
mixing N of the incoming audio signals according to the modified first set of audio conference mixing parameters to produce a first mixed audio signal, where N is an integer greater than one; and
outputting the first mixed audio signal.

22. An audio conference bridging system for bridging a plurality of participant stations together in an audio conference, comprising:
a system control unit adapted to receive mixing control data from a plurality of participant stations, including at least a first participant station and a plurality of other participant stations, and to produce at least a first set of audio-conference mixing parameters based at least on first mixing control data received from the first participant station, the first mixing control data including data necessary to derive individual mixing parameters for at least two incoming audio signals from other than the first participant station;
an audio bridging unit, operatively connected to the system control unit, adapted to receive a plurality of audio signals from the plurality of participant stations and receive the first set of audio conference mixing parameters from the system control unit, the audio bridging unit including:
a first EdgePoint mixer adapted to dynamically modify the first set of audio conference mixing parameters pursuant to an algorithm for creating a desired effect and mix at least N of the plurality of audio signals according to the modified first set of audio-conference mixing parameters to produce a first mixed audio signal, where N is an integer greater than one;
and the audio bridging unit adapted to output the first mixed audio signal.

23. An audio-conference bridging system for bridging a plurality of participant stations in an audio conference, wherein the participant stations include a visual interface depicting a virtual conference world and the virtual conference world includes avatars representing participants associated with the participant stations, comprising:
means for receiving audio signals from the plurality of participant stations;
means for receiving mixing control data from the plurality of participant stations, the mixing control data including data representing the position of the avatars within the virtual conference world;
means for setting separate mixing control parameters for each of the plurality of participant stations based at least on the mixing control data;
means for mixing the audio signals according to the mixing control parameters to produce separate mixed audio signals for each of the participant stations; and
means for outputting the mixed audio signals to the participant stations.

24. A method for facilitating an audio conference bridging a plurality of participant stations, wherein the participant stations include a visual interface depicting a virtual conference world and the virtual conference world includes avatars representing participants associated with the participant stations, comprising:
receiving audio signals from the plurality of participant stations;

receiving mixing control data from the plurality of participant stations, the mixing control data including data representing the position of the avatars within the virtual conference world;

setting separate mixing control parameters for each of the plurality of participant stations based at least on the mixing control data;

mixing the audio signals according to the mixing control parameters to produce separate mixed audio signals for each of the participant stations; and outputting the mixed audio signals to the participant stations.

25. An audio conference bridging system for dynamically bridging a plurality of participant stations together in an audio conference, the system comprising a system control unit adapted to receive mixing control data from at least one participant station, wherein
the mixing control data from the at least one participant includes data necessary to derive individual mixing parameters for at least two incoming audio signals from other than the at least one participant station,
the system control unit selects an algorithm for application to the mixing control data for creating a desired effect; and
the system control unit produces at least one set of mixing parameters, including the individual mixing parameters and the selected algorithm, based upon the mixing control data received from the at least one participant station;

an audio bridging unit operatively connected to the system control unit, wherein the audio bridging unit is adapted to
receive a plurality of audio signals associated with the plurality of participant stations, respectively;
receive the at least one set of mixing parameters from the system control unit; and
associate the at least one set of mixing parameters with the plurality of audio signals; and a mixing unit operatively associated with the audio bridging unit and adapted to
mix at least N of the plurality of audio signals, where N is an integer greater than one, according to the at least one set of mixing parameters to produce the at least one mixed audio signal, and
output at the least one mixed audio signal.

26. The audio conference bridging system of claim 25 further comprising a media interface unit adapted to
receive the plurality of audio signals in a plurality of signal formats,
convert the plurality of audio signals into a single uniform format, and
transfer the converted plurality of audio signals to the audio bridging unit.

27. The audio conference bridging system of claim 25, wherein the media interface unit is further adapted to
receive the at least one mixed audio signal output from the audio bridging unit;
convert the at least one mixed audio signal into an original signal format preferable to the at least one participant station; and
transmit the at least one mixed audio signal to the at least one participant station.

28. The audio conference bridging system of claim 25, wherein the algorithm includes a speech activity detection routine, which identifies audio signals of active participants at any given time during the audio conference and reduces the number of possible audio signals for mixing by the mixing unit from all of the plurality of audio signals to only the audio signals of active participants.

29. The audio conference bridging system of claim 25, wherein the algorithm includes a signal strength detection routine, which evaluates the signal strength of each of the plurality of audio signals and reduces the number of possible audio signals for mixing by the mixing unit to only audio signals of meeting a predetermined criteria based on signal strength.

30. The audio conference bridging system of claim 25, wherein the control data comprises position information related to the virtual positions of the plurality of participants in a virtual space and the algorithm includes a position detection and compensation routine, which adjusts the at least one mixed audio signal to reflect the relative virtual positions of the plurality of participants.

* * * * *